United States Patent
Kano et al.

(10) Patent No.: US 11,629,071 B2
(45) Date of Patent: Apr. 18, 2023

(54) METHOD FOR PRODUCING ULTRAPURE WATER

(71) Applicant: Merck Patent GmbH, Darmstadt (DE)

(72) Inventors: Ichiro Kano, Montigny le Bretonneux (FR); Gabriela Dima, Villebon sur Yvette (FR); Yann Ratieuville, Paris (FR)

(73) Assignee: Merck Patent GmbH

( * ) Notice: Subject to any disclaimer, the term of this patent is extended or adjusted under 35 U.S.C. 154(b) by 66 days.

(21) Appl. No.: 16/481,545

(22) PCT Filed: Feb. 13, 2018

(86) PCT No.: PCT/EP2018/053467
§ 371 (c)(1),
(2) Date: Jul. 29, 2019

(87) PCT Pub. No.: WO2018/146318
PCT Pub. Date: Aug. 16, 2018

(65) Prior Publication Data
US 2020/0024156 A1  Jan. 23, 2020

(30) Foreign Application Priority Data
Feb. 13, 2017 (EP) ...................... 17290017

(51) Int. Cl.
*C02F 1/42* (2006.01)
*B01J 47/026* (2017.01)
(Continued)

(52) U.S. Cl.
CPC .............. *C02F 1/42* (2013.01); *B01J 47/026* (2013.01); *B01J 47/04* (2013.01); *C02F 1/283* (2013.01);
(Continued)

(58) Field of Classification Search
None
See application file for complete search history.

(56) References Cited

U.S. PATENT DOCUMENTS

| 4,421,652 A | 12/1983 | Heskett |
| 4,430,226 A | 2/1984 | Hegde et al. |

(Continued)

FOREIGN PATENT DOCUMENTS

| CA | 2960152 A1 | 3/2016 |
| CN | 1829563 A | 9/2006 |

(Continued)

OTHER PUBLICATIONS

Lanxess/Sybron IONAC NM60-SG product brochure, http://lewatit.co.kr/pop/pdf/NM60SG.pdf, downloaded Feb. 1, 2022 (Year: 2022).*
Co-pending U.S. Appl. No. 16/481,547, filed Jul. 29, 2019 by Kano et al., and the Office actions and references cited therein.
International Search Report and Written Opinion dated Apr. 20, 2018 in co-pending PCT application No. PCT/EP2018/053439.
(Continued)

*Primary Examiner* — Chester T Barry
(74) *Attorney, Agent, or Firm* — Nields, Lemack & Frame, LLC

(57) ABSTRACT

The present invention relates to a method for producing purified water comprising a step (a) of passing water through a first mixed bed ion exchanger comprising beads having a diameter between 0.5 and 0.7 mm and a step (b) of passing water through a second mixed bed ion exchanger comprising beads having a diameter of less than 0.5 mm. The invention further relates to a module comprising the first and second mixed bed ion exchanger and to a water treatment system for producing ultrapure water comprising the first and second mixed bed ion exchanger.

18 Claims, 14 Drawing Sheets

Figure 1:
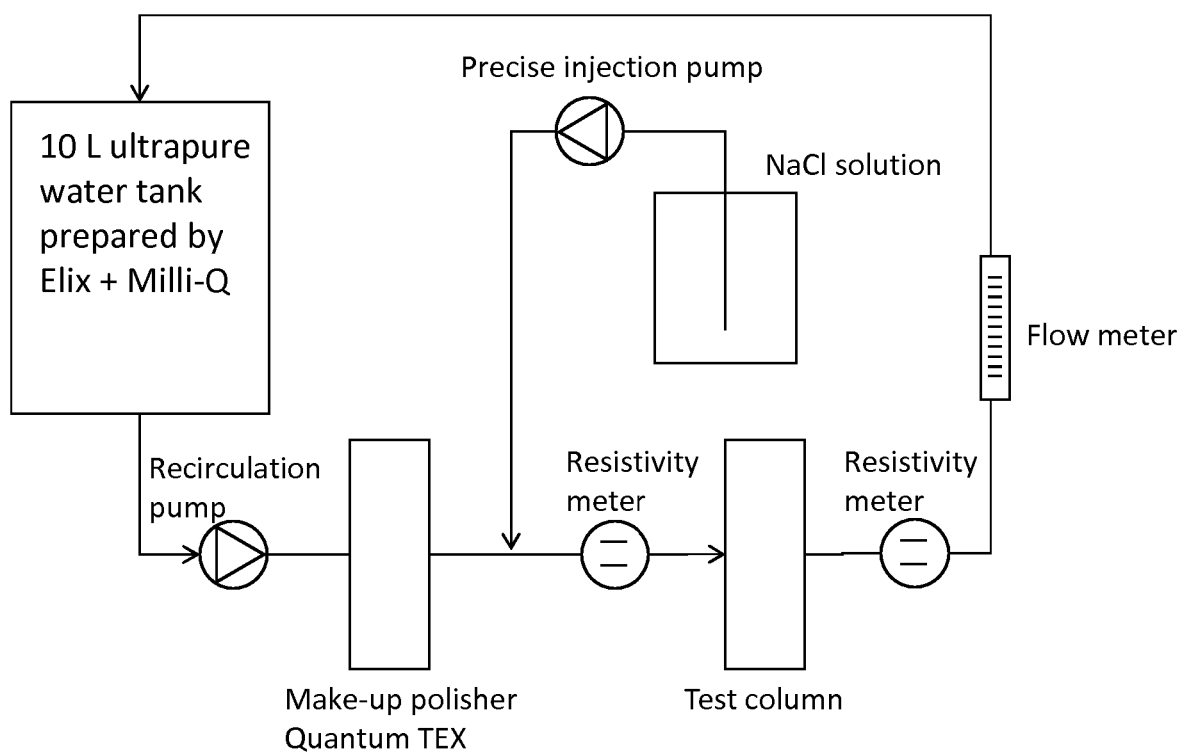

(51) Int. Cl.
  *B01J 47/04* (2006.01)
  *C02F 1/28* (2023.01)
  *C02F 9/00* (2023.01)
  *C02F 1/44* (2023.01)
  *C02F 1/469* (2023.01)
  *C02F 103/04* (2006.01)

(52) U.S. Cl.
  CPC ............... *C02F 9/00* (2013.01); *C02F 1/441* (2013.01); *C02F 1/4695* (2013.01); *C02F 2001/427* (2013.01); *C02F 2103/04* (2013.01)

(56) References Cited

U.S. PATENT DOCUMENTS

| | | | | |
|---|---|---|---|---|
| 5,022,994 | A * | 6/1991 | Avery | C02F 1/42 137/624.12 |
| 5,073,268 | A | 12/1991 | Saito et al. | |
| 5,250,187 | A | 10/1993 | Franks | |
| 5,464,532 | A | 11/1995 | Nowlin et al. | |
| 5,552,056 | A | 9/1996 | Ragosta | |
| 5,645,727 | A | 7/1997 | Bhave et al. | |
| 5,868,924 | A | 2/1999 | Nachtman et al. | |
| 7,670,676 | B2 * | 3/2010 | Horiishi | H01F 1/0054 428/357 |
| 9,023,185 | B2 * | 5/2015 | Gifford | B01D 61/48 204/632 |
| 2002/0026675 | A1 | 3/2002 | Kravtchenko et al. | |
| 2002/0179508 | A1 * | 12/2002 | Nachtman | C02F 9/005 210/136 |
| 2003/0127388 | A1 | 7/2003 | Ando et al. | |
| 2007/0151924 | A1 | 7/2007 | Mir et al. | |
| 2008/0041790 | A1 * | 2/2008 | Rajan | C02F 1/28 210/669 |
| 2008/0210606 | A1 | 9/2008 | Burbank et al. | |
| 2008/0264868 | A1 | 10/2008 | Murray et al. | |
| 2008/0314763 | A1 * | 12/2008 | Saito | C25F 3/00 205/687 |
| 2009/0008318 | A1 | 1/2009 | Anes et al. | |
| 2009/0101586 | A1 | 4/2009 | Brings et al. | |
| 2009/0218289 | A1 * | 9/2009 | Brings | G21C 19/46 210/682 |
| 2010/0130626 | A1 | 5/2010 | Fukui et al. | |
| 2011/0245127 | A1 * | 10/2011 | Suzuki | C11D 1/008 510/163 |
| 2014/0263072 | A1 | 9/2014 | Voigt et al. | |
| 2015/0238908 | A1 | 8/2015 | Ding et al. | |
| 2015/0315055 | A1 | 11/2015 | Chidambaran et al. | |
| 2016/0115046 | A1 | 4/2016 | Gifford et al. | |
| 2016/0229711 | A1 | 8/2016 | Boodoo et al. | |
| 2018/0057370 | A1 * | 3/2018 | Lin | C02F 1/4695 |
| 2018/0214845 | A1 | 8/2018 | Gluckman et al. | |
| 2019/0217250 | A1 | 7/2019 | Ichihara et al. | |
| 2019/0314806 | A1 | 10/2019 | Slagt et al. | |
| 2020/0024155 | A1 | 1/2020 | Kano et al. | |
| 2020/0024157 | A1 | 1/2020 | Kano et al. | |
| 2020/0189938 | A1 | 6/2020 | Kano et al. | |

FOREIGN PATENT DOCUMENTS

| | | |
|---|---|---|
| CN | 202246289 U | 5/2012 |
| CN | 202297292 U | 7/2012 |
| CN | 202881021 U | 4/2013 |
| CN | 103359850 A | 10/2013 |
| CN | 103370283 A | 10/2013 |
| CN | 105036412 A | 11/2015 |
| EP | 0429661 A1 | 6/1991 |
| EP | 0880469 B1 | 3/2000 |
| EP | 1533033 A1 | 5/2005 |
| JP | 60-71098 A | 4/1985 |
| JP | 60-232208 A | 11/1985 |
| JP | 61-106306 A | 5/1986 |
| JP | 62-11593 A | 1/1987 |
| JP | 62-87702 A | 4/1987 |
| JP | 63-44988 A | 2/1988 |
| JP | 63-156591 A | 6/1988 |
| JP | 3-4345 Y2 | 2/1991 |
| JP | 3-151092 A | 6/1991 |
| JP | 4-78483 A | 3/1992 |
| JP | 4-244289 A | 9/1992 |
| JP | 4-293581 A | 10/1992 |
| JP | 10-216721 A | 8/1998 |
| JP | 3128249 B2 | 1/2001 |
| JP | 2001-515397 A | 9/2001 |
| JP | 2003-251118 A | 9/2003 |
| JP | 2003-266069 A | 9/2003 |
| JP | 2008-272713 A | 11/2008 |
| JP | 2009-541032 A | 11/2009 |
| WO | 97/29048 A1 | 8/1997 |
| WO | 98/09916 A1 | 3/1998 |
| WO | 03/072221 A1 | 9/2003 |
| WO | 2005/011849 A2 | 2/2005 |
| WO | 2009/075666 A2 | 6/2009 |
| WO | 2013/151654 A1 | 10/2013 |
| WO | 2016/128107 A1 | 8/2016 |

OTHER PUBLICATIONS

International Search Report and Written Opinion dated Mar. 26, 2018 in co-pending PCT application No. PCT/EP2018/053441.
International Search Report and Written Opinion dated Apr. 20, 2018 in corresponding PCT application No. PCT/EP2018/053467.
International Search Report and Written Opinion dated May 7, 2018 in co-pending PCT application No. PCT/EP2018/053442.
Lanxess "Product Information Lewatit NM 60 SG" Jan. 17, 2012.
Miller et al., "Understanding Ion-Exchange Resins for Water Treatment Systems", Suez Water Technologies, Feb. 1981.
Kun et al., "The Pore Structure of Macroreticular Ion Exchange Resins", Journal of Polymer Science, No. 16, pp. 1457-1469, 1967.
Office action dated Dec. 1, 2020 in co-pending U.S. Appl. No. 16/481,544.
Lenntech—Rohm and Haas Amberlite IRN150 Product Data Sheet, 2021.
Office Action dated Apr. 14, 2021 in co-pending U.S. Appl. No. 16/481,539.
Final Rejection dated Apr. 14, 2021 in co-pending U.S. Appl. No. 16/481,544.
Lenntech Lewatit UltraPure 1292 MD Product Information, Oct. 13, 2011.
European communication dated Apr. 1, 2021 in co-pending European patent application No. 18703356.8.
European communication dated Jul. 1, 2021 in co-pending European patent application No. 18703355.0.
European communication dated Mar. 25, 2021 in co-pending European patent application No. 18703354.3.
Dowex Monosphere MR-3 UPW: A Separable Uniform Particle Size Mixed Bed Ion Exchange Resin for Ultrapure Water Production, Mar. 1, 2007, https://www.lenntech.com/Data-sheets/Dowex-Monosphere-MR-3-UPW-L.pdf.
Japanese communication, with English translation, dated Nov. 26, 2021 in co-pending Japanese patent application No. 2019-543291.
Office action dated Jan. 14, 2022 in co-pending U.S. Appl. No. 16/481,547.
Dupont, Product Data Sheet, "AmberLite IRA410 Cl Ion Exchange Resin", Nov. 2019.
Office action dated Sep. 17, 2021 in co-pending U.S. Appl. No. 16/481,544.
Dupont, Amberlite IRN 150 Product Data Sheet, 2020.
Final rejection dated Aug. 19, 2021 in co-pending U.S. Appl. No. 16/481,539.
Office action dated Nov. 10, 2021 in co-pending U.S. Appl. No. 16/481,539.
Chinese communication, with English translation, dated Aug. 13, 2021 in co-pending Chinese patent application No. 201880011711.5.
Japanese communication, with English translation, dated Oct. 1, 2021 in co-pending Japanese patent application No. 2019-543835.

(56) References Cited

OTHER PUBLICATIONS

Japanese communication, with English translation, dated Nov. 9, 2021 in corresponding Japanese patent application No. 2019-543202.
European communication dated Feb. 4, 2022 in corresponding European patent application No. 18703607.4.
Final Rejection dated Mar. 16, 2022 in co-pending U.S. Appl. No. 16/481,539.
Final Rejection dated May 17, 2022 in co-pending U.S. Appl. No. 16/481,544.
Guojian, Functional Polymer Materials, Second Edition, Tongji University Press, Jun. 1, 2014.
Chinese communication, with English translation, dated Apr. 19, 2022 in co-pending Chinese patent application No. 201880011740.1.
Co-pending U.S. Appl. No. 16/481,539, filed Jul. 29, 2019 by Kano et al., and the Office actions and references cited therein.
Co-pending U.S. Appl. No. 16/481,544, filed Jul. 29, 2019 by Kano et al., and the Office actions and references cited therein.
Japanese communication, with English translation, dated Jul. 4, 2022 in co-pending Japanese patent application No. 2019-543835.
Office action dated Oct. 19, 2022 in co-pending U.S. Appl. No. 16/481,544.
Final Rejection dated Sep. 20, 2022 in co-pending U.S. Appl. No. 16/481,547.
Office action dated Dec. 7, 2022 in co-pending U.S. Appl. No. 16/481,539.

* cited by examiner

|  | 1 (prior art) | 2 (comparison) | 3 (invention) | 4 (invention) | 5 (invention) | 6 (comparison) |
|---|---|---|---|---|---|---|
| 1st column | Organex 32 cm | Organex 20 cm | Organex 32 cm | Standard resin 16 cm | Organex 20 cm | Standard resin 30 cm |
| 2nd column | Standard resin 32 cm | Standard resin 20 cm | Standard resin 10 cm + small bead resin 11 cm | Standard resin 10 cm + small bead resin 11 cm | Small bead resin 11 cm | NA |

Fig. 3A

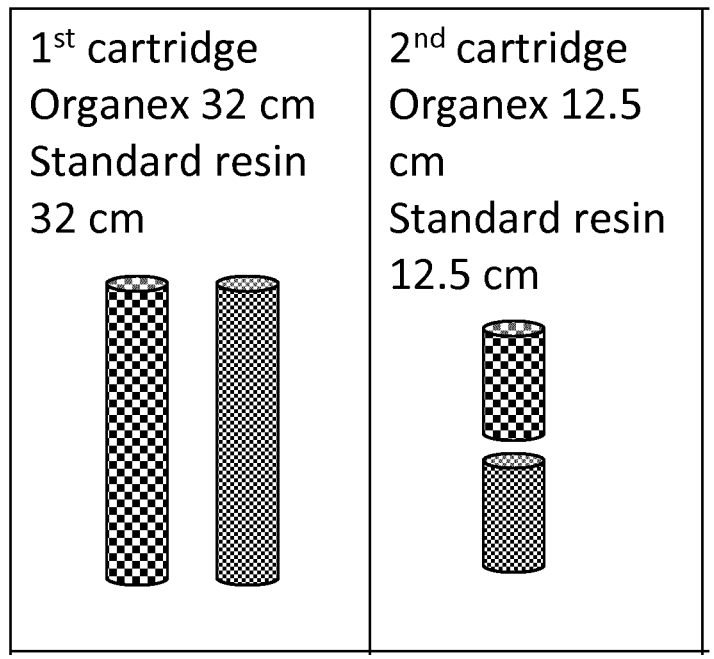
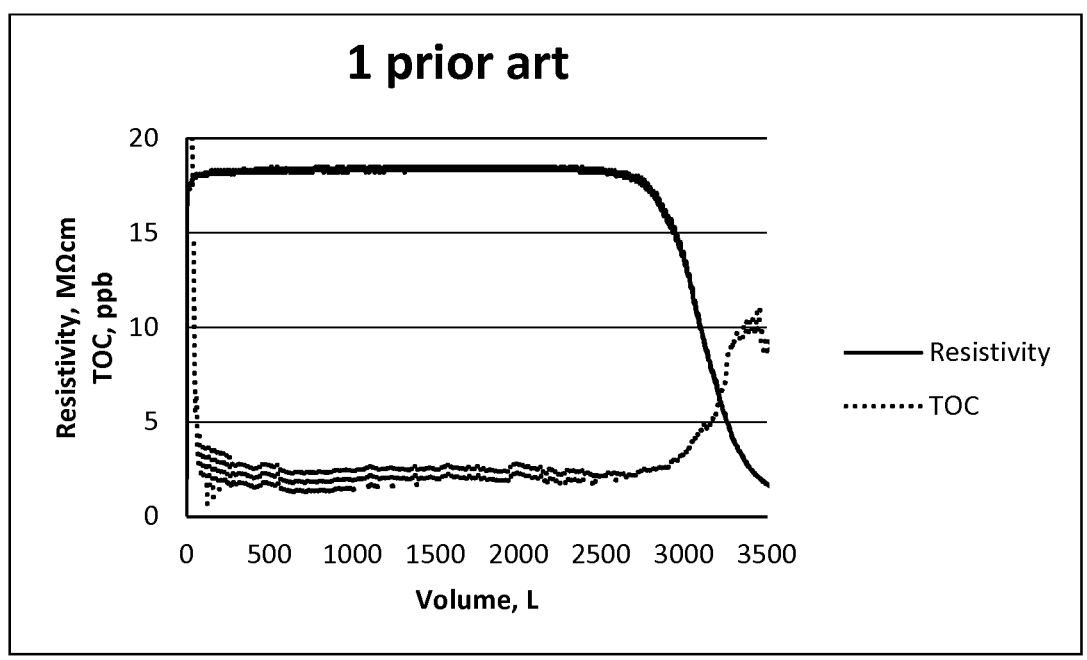
Fig. 4.1

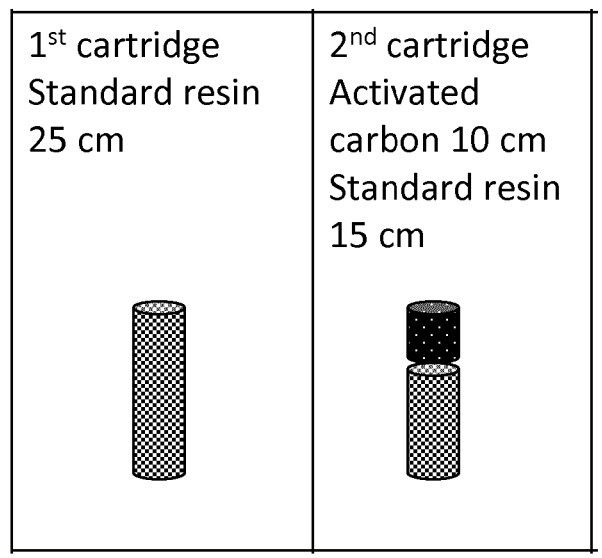
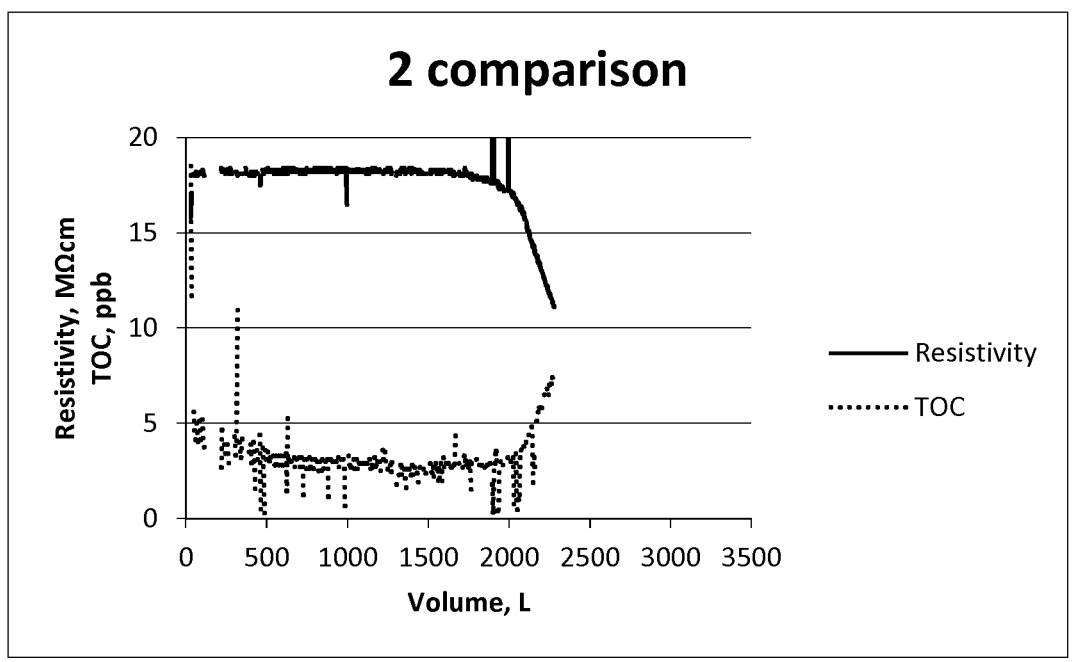
Fig. 4.2

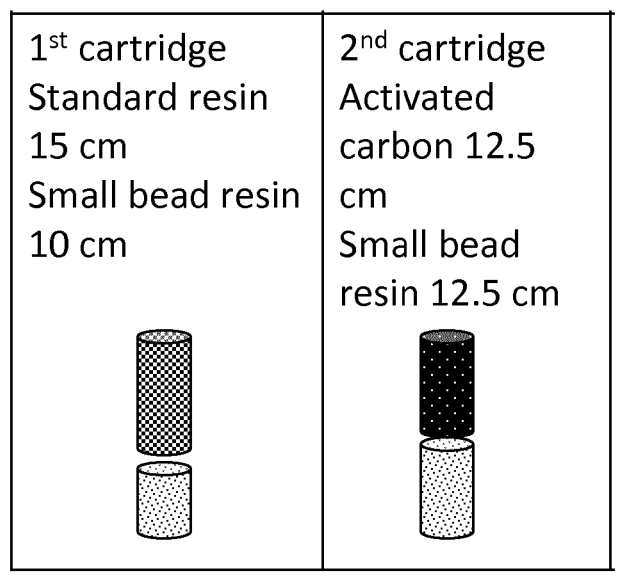
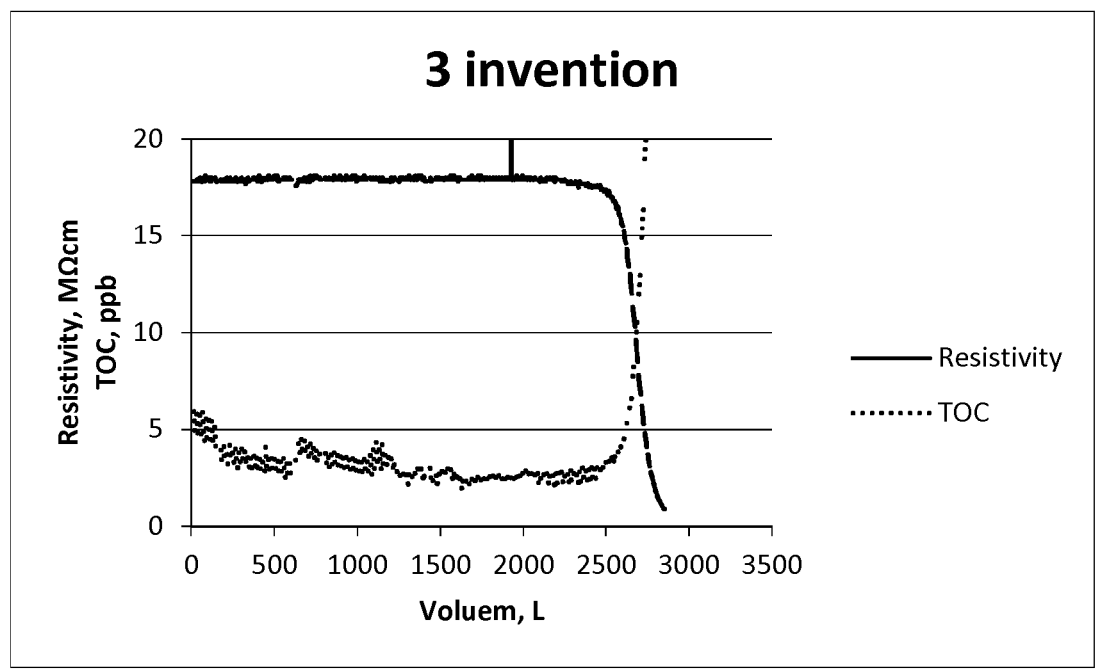
Fig. 4.3

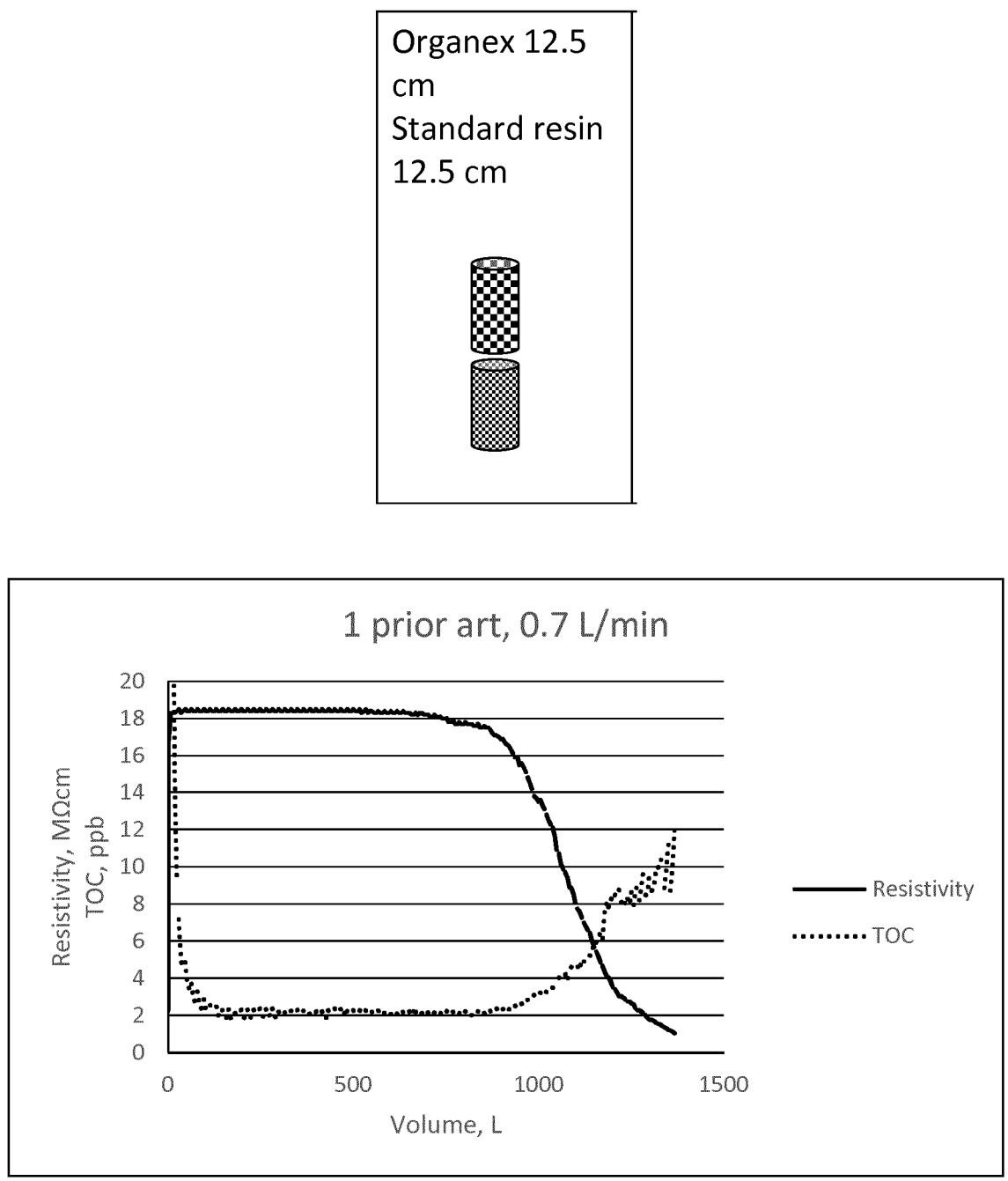
Fig. 5.1

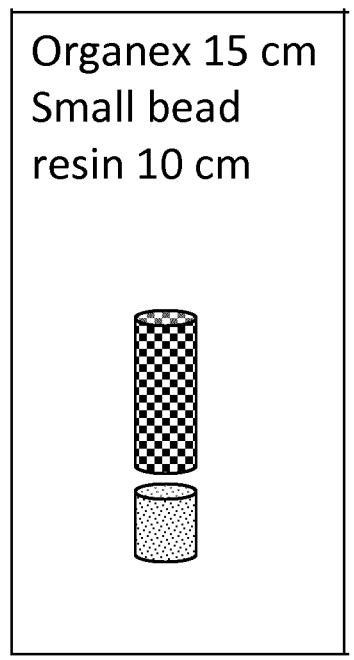
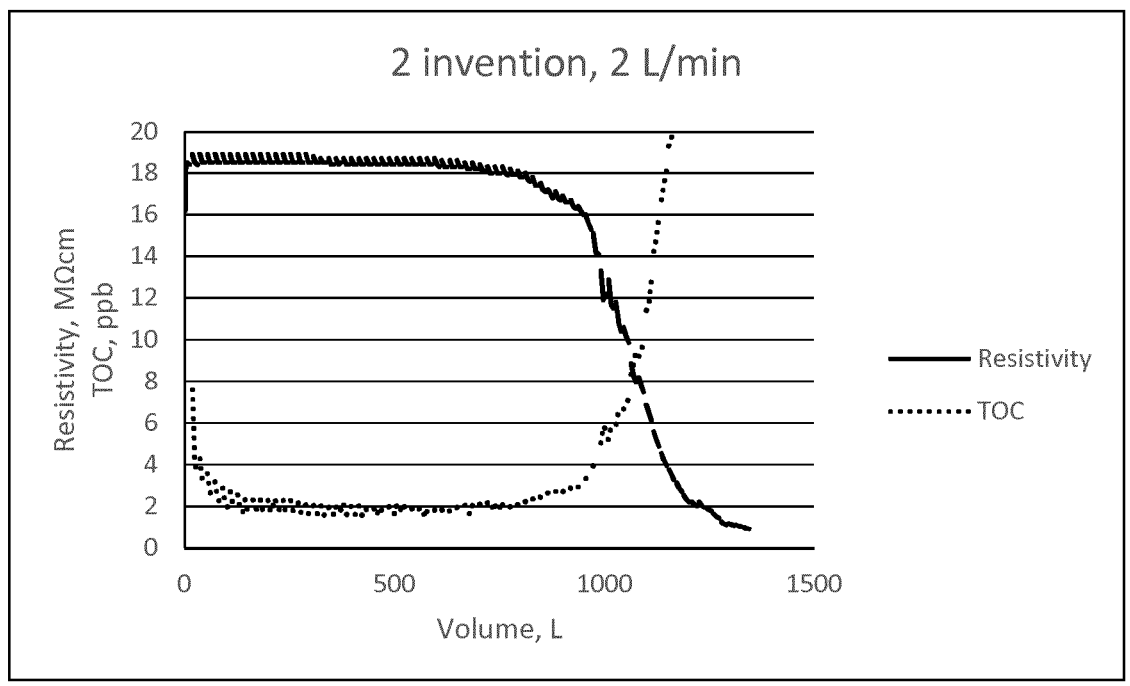
Fig. 5.2

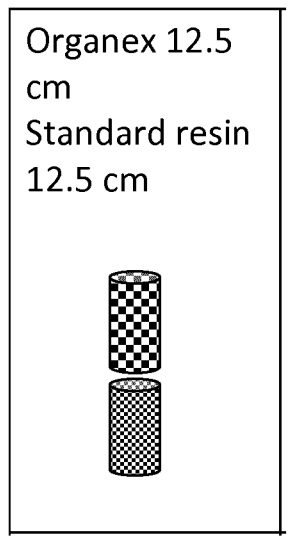
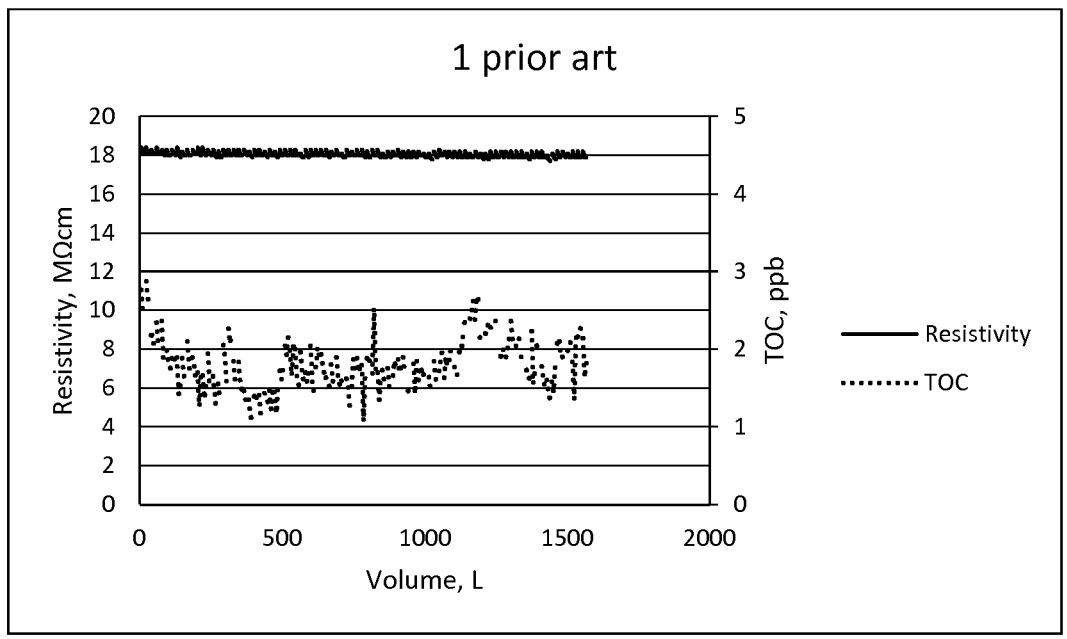
Fig. 6.1

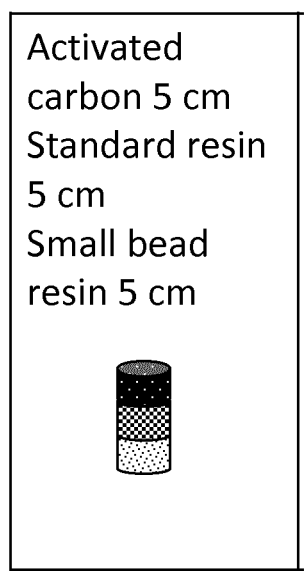
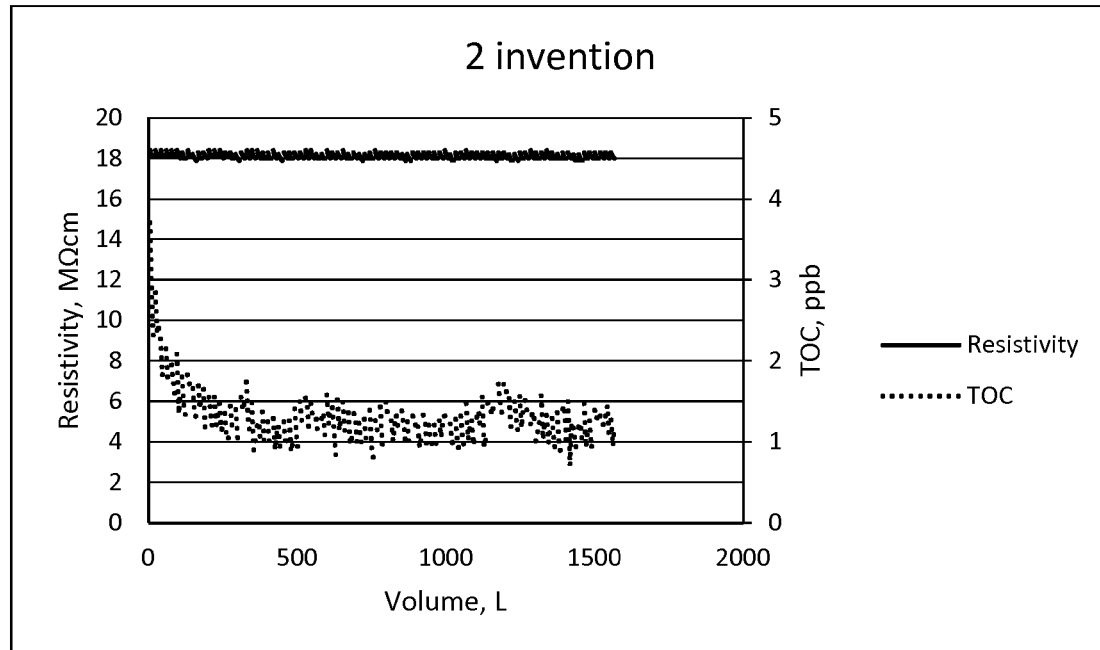
Fig. 6.2

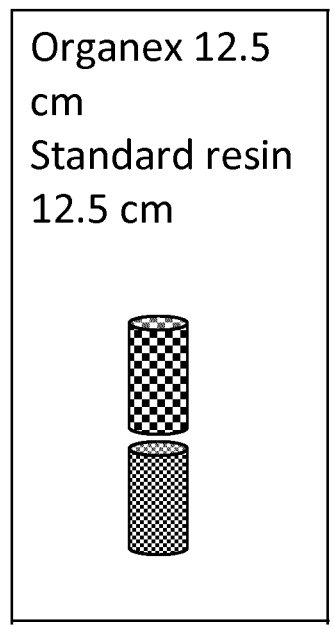
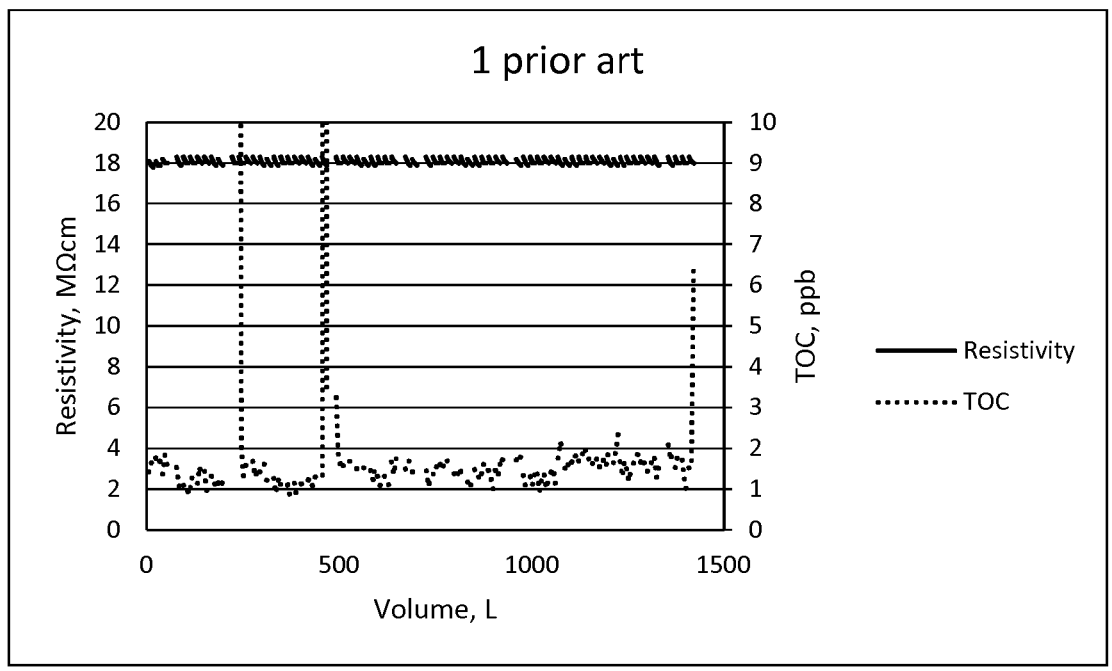
Fig 7.1

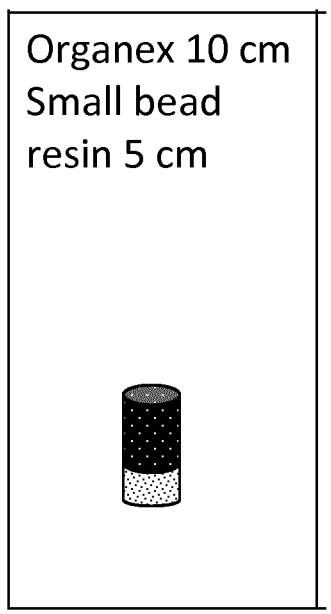
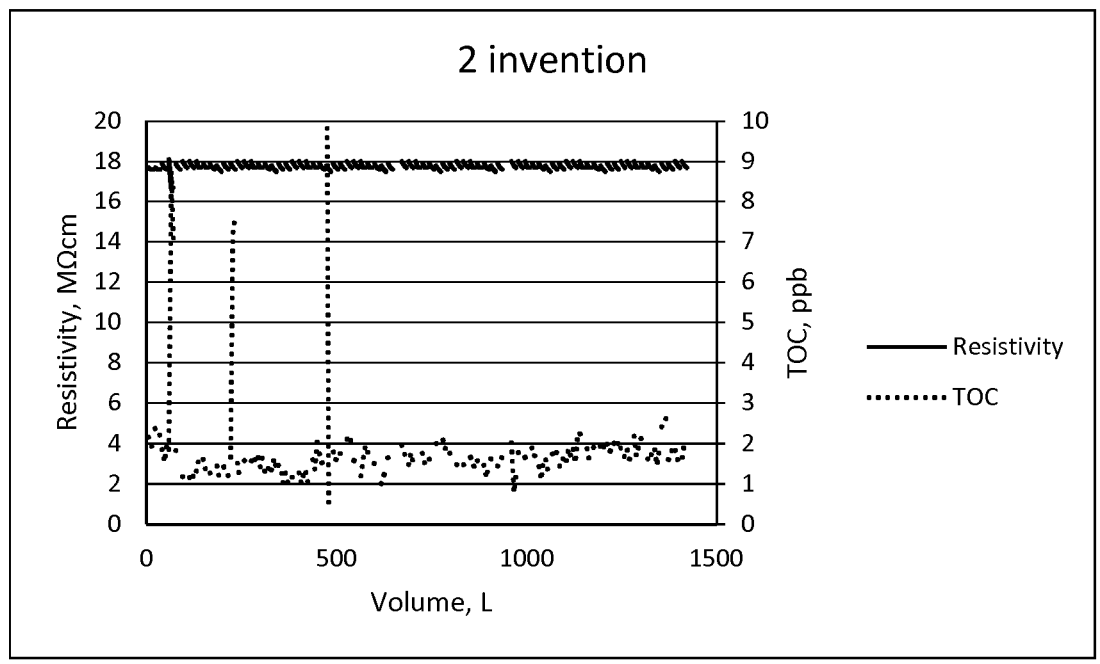
Fig 7.2

METHOD FOR PRODUCING ULTRAPURE WATER

The present invention relates to a method for producing purified water comprising a step (a) of passing water through a first mixed bed ion exchanger comprising beads having a diameter between 0.5 and 0.7 mm and a step (b) of passing water through a second mixed bed ion exchanger comprising beads having a diameter of less than 0.5 mm. The invention further relates to a module comprising the first and second mixed bed ion exchanger and to a water treatment system for producing ultrapure water comprising the first and second mixed bed ion exchanger.

Laboratory ultrapure water is prepared from municipal water through a combination of several technologies. Typically, activated carbon, reverse osmosis, ion exchange resins, micro/ultrafiltration, ultraviolet irradiation and sterile grade microfiltration are used alone or in combination for purifying water. Ultrapure water polishing is the last step of water purification. Milli-Q® (a commercial product from Merck KGaA, Darmstadt, Germany) employs ion exchange resins, activated carbon, a germicidal and/or photooxidation UV lamp, microfiltration and/or ultrafiltration.

Ultrapure water (or Type 1 water) is typically characterized by a resistivity of greater than 18 MΩ·cm (at 25° C.) and a value of total organic compound (TOC) of less than 20 parts per billion (ppb). Type 2 water is typically characterized by a resistivity of greater than 1.0 MΩ·cm and a TOC value of less than 50 ppb. Type 3 water is the lowest laboratory water grade, recommended for glassware rinsing or heating baths, for example, or to feed Type 1 lab water systems. It is characterized by a resistivity of greater than 0.05 MΩ·cm and a TOC value of less than 200 ppb.

In the state of the art the final polishing step in ultrapure water production is accomplished by using ion exchange media allowing for the removal of anions and cations.

Ion exchangers, also called ion exchange resins throughout this invention, are known and proven for the elimination of ionic impurities from water in pure and ultrapure water production. Typically, these are spherically polymerized styrene beads with 0 to 16% of divinylbenzene cross linking, functionalized by sulfonation for cation exchange and amination for anion exchange and regenerated by strong acid and strong basic solutions, respectively, or other techniques such as electrochemical regeneration. In the following the term "resin" or "resin bead" is used for the ion exchange material itself (i.e. the ion exchange beads), and the terms "resin bed" or "resin layer" are used for the resin bed to be used in a specific arrangement. The "resin" is typically a mixed media of both anion and cation exchange resins at adequate mixing proportion resulting in equal capacity for both types of ions or asymmetric capacity for specific water applications. Resins to be used for pure and ultrapure water production require a high regeneration degree, such as 95 to 99%, or even higher. This means that this percentage of ion exchange sites is regenerated to H form for cation exchange and to OH form for anion exchange. For ultrapure water polishing a high resin purity is required, i.e. with a very low content of contaminants, as well as an extremely low leaching of total organic carbon. For this reason resins are typically further purified.

Water deionization for pure and ultrapure water production in science and industry is typically done by ion exchange resin beads. The dimension of the deionization cartridges depends on the expected flow rate, the volume to be treated and the quality of produced water. For example, a disposable cartridge for a small laboratory water system may contain 1 to 3 L of resin, whereas a resin bottle for large industrial scale typically contains 5 to 20 L of resin.

Today, granular bead type resins are the only media available in industry and market. All granular media comprise particles of around 600 to 700 µm in diameter, being the standard size in industrial use of ion exchange water deionization. Typically, when RO pretreated municipal water (5-25 µS/cm conductivity) is used to feed an ultrapure water system, the cartridge column height should be 700 to 1000 mm for achieving a water quality exhibiting a resistivity of 18.2 MΩ·cm. In order to allow for an adequate contact time to eliminate ions in a one pass treatment the diameter of the cartridge is determined. For example, the earlier Milli-Q® system (Millipore) with 4 bowls has an inner cartridge diameter of 69 mm and a total resin bed height of 900 mm, reflecting the minimum necessary resin bed height for achieving ultrapure water quality. Reduction of cartridge height may result in a decrease in water quality (i.e. ultrapure grade cannot be reached) or in a decrease of cartridge lifetime.

Figure 8:
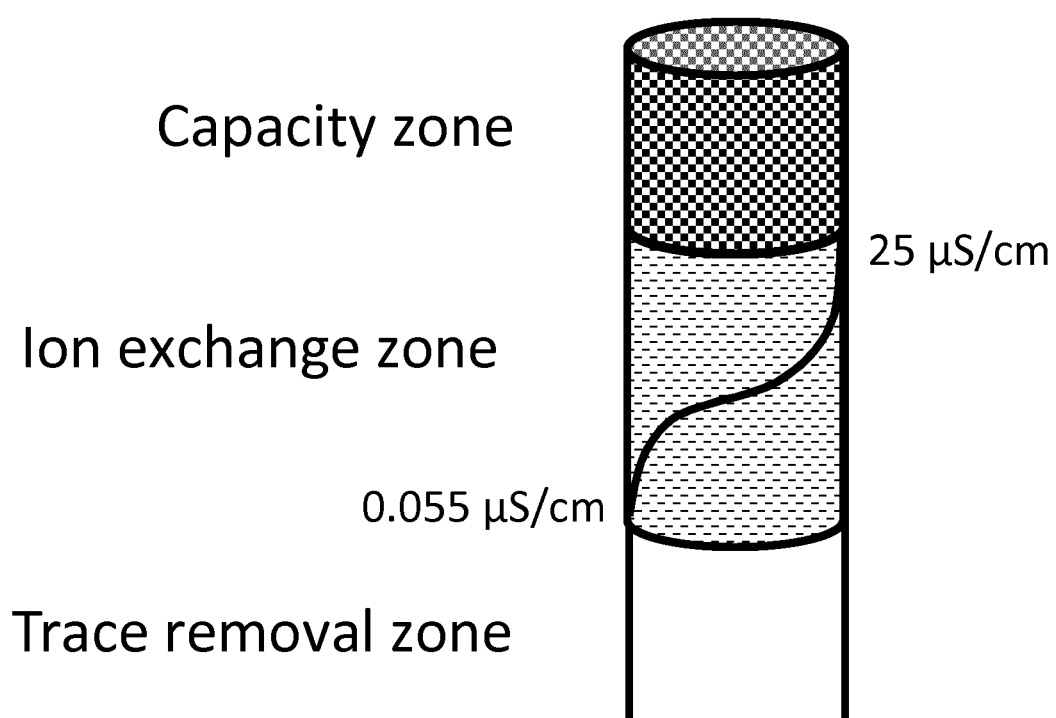

In the lifetime of an ion exchange cartridge for water deionization, three zones can be defined, as illustrated in FIG. 8. The minimum resin bed height is called the "ion exchange zone", which is responsible for achieving the expected water quality. The height is variable as a function of feed water quality, velocity and target effluent quality. A water treatment cartridge with only this ion exchange zone performs enough to achieve water quality, but with zero capacity. When water treatment is continued this zone advances forward because of resin bed saturation. The height of the zone depends on resin kinetics: A faster kinetic resin has a shorter zone, a slower kinetic resin a longer zone. The zone upstream of this exchange zone is called "capacity zone". The longer this zone the higher is the obtainable capacity.

This means that in the state of the art the size of the cartridge can only be reduced by reducing the capacity zone, reducing the capacity of the cartridge; whereas the ion exchange zone cannot be shortened without losing water quality. The only way of reducing this zone is by improving the kinetics of the resin. The last zone downstream of the ion exchange zone is called "trace removal zone", which is used especially for cartridges used in laboratory ultrapure water systems. This zone guarantees ultrapure water free from trace elements which cannot be detected early by a water quality indicator such as a resistivity meter.

There have been some attempts to improve the kinetics of such standard ion exchange media in order to provide better performing polishing solutions. Several of the prior art documents propose the use of small bead ion exchange media for improving their kinetics. Within this regard it is evident that smaller size adsorption media exhibit faster kinetics due to its larger contact surface per bed volume. At the same time, this results in the disadvantage of a higher hydraulic pressure.

Typically, the reduction of the ion exchange resin bead diameter from 550 to 250 µm would increase the pressure drop by circa 5 times. Smaller size beads allow for twice faster kinetics, but with 4 times more hydraulic stress. In the set-up of the hydraulic system the pressure drop is one of the most important parameters which determines the size of the pump which is the most energy consuming component. From a theoretical point of view double pressure requires double power, also influencing all electrical and mechanical loss. In addition, a higher pressure applied to the resin bed column requires more robustness of all hydraulic piping systems. Small ultrapure water production systems in laboratory typically run around 2-3 bar pressure with a booster pump. The systems are often installed in quiet laboratory environments where noise coming from powerful pumps would disturb users.

In addition, a high pressure applied to the resin bed column consequently results in a mechanical stress onto the resin beads, which may finally result in cracking of the resin beads. Such particles may pollute the water and the smaller bead fragments may further increase the pressure drop.

U.S. Pat. No. 5,250,187 describes the use of high kinetic type resins for ion exchange applications. The proposed resin is a fine mesh type resin with small particle diameters. The resin is used in a fluidized bed in up-flow for overcoming the disadvantage of the high hydraulic pressure. This mechanism requires a specific design of the resin vessel. The fluidized bed has the disadvantage of trace leakage of untreated ions. This is tolerable in water softening applications, but would not be suitable for water polishing in ultrapure water production.

The objective of US 2009/101586 A1 is the efficient removal of radionuclides from nuclear power plant water. Within this regard ordinary gel type resin has certain limitations in radioelement removal efficiency. This document therefore suggests the use of an additional layer of small size macroporous type anion exchange resin and/or small size macroporous type chelating resin.

WO 2013/151654 A1 describes the use of small size granular adsorption media together with a polymeric binder in a filtration device. The combination with a binder allows to reduce the pressure drop and to enable low stress filtration.

EP 1533033 A1 proposes monolithic ion exchange media with a higher contact surface than regular ion exchange resins as fast kinetic ion exchange media without pressure drop increase.

U.S. Pat. No. 4,421,652 describes a method for treating fluids using a small bead resin. The resin bed is packed loosely in order to avoid a high pressure drop.

Because of the several disadvantages described above small bead resins have never been used for water deionization or pure/ultrapure water production, despite their advantageous faster kinetics.

There is therefore still a demand for solutions allowing for the use of fast kinetic ion exchange media without generating a high pressure drop.

The object of the present invention was therefore to provide a solution for using advantageous fast kinetic ion exchange media in water purification methods, without facing the above mentioned disadvantages such as a high pressure drop.

Surprisingly it was found that the combination of standard ion exchange media with small bead ion exchange media results in a very good performance in water treatment improving at the same time the capacity of the media and the compactness of the consumable.

A first embodiment of the present invention is therefore a method for producing purified water comprising a step (a) of passing water through a first mixed bed ion exchanger comprising beads having a diameter between 0.5 and 0.7 mm and a step (b) of passing water through a second mixed bed ion exchanger comprising beads having a diameter of less than 0.5 mm.

According to the present invention, the term purified water refers to water of Type 1, Type 2 or Type 3, or DI (deionized) water, as defined above. In a preferred embodiment the purified water is ultrapure water, i.e. Type 1 water, characterized by a resistivity of greater than 18 $M\Omega \cdot cm$ (at 25° C.) and a value of total organic compound (TOC) of less than 20 parts per billion (ppb).

In the method of the present invention step (a) and step (b) can be performed in any order, i.e. step (a) can be performed before step (b) or step (b) can be performed before step (a). In a preferred embodiment step (a) is performed before step (b). In this case, the water is first passed through the first mixed bed ion exchanger comprising beads having a diameter between 0.5 and 0.7 mm and later through the second mixed bed ion exchanger comprising beads having a diameter of less than 0.5 mm.

An ion exchanger is an insoluble matrix typically in the form of beads, fabricated from an organic polymer substrate (ion-exchange resin). According to the present invention, a gel-type ion exchanger is used, which comprises a mixture of anion exchange particles and cation exchange particles in the form of beads, respectively ("mixed bed").

Typically, an anion exchange particle is capable of exchanging hydroxide anions with anions in solution. The cation exchange particles are capable of exchanging hydrogen ions with cations in solution. The mixture of anion exchange particles and cation exchange particles can also include particles of activated carbon which adsorb charged or non-charged organic species which may be present in the water. In a preferred embodiment the mixed bed ion exchanger consists of a mixture of anion exchange particles and cation exchange particles.

The diameter of the beads of the first mixed bed ion exchanger is between 0.5 and 0.7 mm. This resin is also referred to as "standard resin" or "standard ion exchanger".

The diameter of the beads of the second mixed bed ion exchanger is less than 0.5 mm. In a preferred embodiment, the beads' diameter is 0.3 to 0.45 mm. Such resin is also referred to as "small bead resin" or "small bead ion exchanger".

Preferably, the ratio of the diameter of the beads having a diameter of less than 0.5 mm to the diameter of the beads having a diameter between 0.5 and 0.7 mm is less than 0.9. More preferably, this ratio is less than 0.8, most preferably less than 0.7. For example, if the beads of the first mixed bed ion exchanger have a mean diameter of 0.6 mm and the beads of the second mixed bed ion exchanger have a mean diameter of 0.4 mm such ratio would be 0.67.

The diameters given in the present invention represent the diameter of the beads in their regenerated state. The given diameter represents the mean particle diameter.

Preferably, the anion exchange beads and the cation exchange beads are monodisperse, respectively. The size of the beads can be determined by microscopic imaging technique instrumentation such as Camsizer (Horiba Camsizer XL), Nikon SMZ-2T microscope or Olympus BX41 microscope with DP71 digital CCD camera and Cell imaging software.

All ion exchange materials known to a person skilled in the art can be used in the present invention. Typically, ion exchange resins are based on copolymers of styrene and divinylbenzene. The copolymerization of styrene and divinylbenzene results in crosslinked polymers, having a crosslink degree of 0 to 16%. The ion exchanging sites are then introduced after polymerization. For example, sulfonating allows the production of cation exchange resins with sulfonic acid groups and chloromethylation followed by amination leads to the introduction of quaternary amino functions for the production of anion exchange resins. The manufacturing processes of ion exchange resins are well-established and a person skilled in the art is familiar with suitable steps, reagents and conditions.

In a preferred embodiment the first and the second mixed bed ion exchangers are, independently, based on styrene divinylbenzene copolymer. More preferably, the mixed bed ion exchangers are based on sulfonated styrene divinylbenzene copolymer (cation exchange) and styrene divinylbenzene copolymer modified with quaternary amino groups (anion exchange).

Typical capacities of the anion exchange resin may be for example 1 eq/L and for the cation exchange resin 2 eq/L. These numbers are however not limiting.

Typically, mixed bed ion exchangers comprise a mixture of anion and cation exchangers in a ratio so that they have equal capacities for both types of ions.

Commercially available ion exchange resins with small beads of between 0.2 and 0.4 mm diameter are, for example:
- DOW, DOWEX MONOSPHERE 99Ca/310, 290-317 µm, average 307 µm
- DOW, DOWEX MONOSPHERE 99Ca/320, 302-352 µm, average 317±15 µm
- DOW, DOWEX MONOSPHERE 99Ca/350, 317-382 µm, average 347±15 µm
- DOW, DOWEX fine mesh, 50-100 mesh (300-150 µm), 100-200 mesh (150-74 µm), 200-400 mesh (74-38 µm)
- Mitsubishi, Diaion UBK530K (350 µm)
- Mitsubishi, Diaion MSO01SS (350 µm)

Further suitable commercially available ion exchange resin with small beads of less than 0.5 mm diameter are listed in the following table:

| Manufacturer | Reference | Bead diameter | Capacity |
|---|---|---|---|
| Dow/Rohm and Haas | Dowex 50W × 8 | 500-100 mesh 0.15-0.3 mm | Cation: 1.7 eq/L |
|  | Dowex 1 × 8 | 500-100 mesh 0.15-0.3 mm | Anion: 1.2 eq/L |
| Mitsubishi | UMA 130J | 0.30 mm | Anion: 1.75 eq/L |
| Lanxess | MDS 200H | 0.33 mm | Cation: 2.3 eq/L |
|  | UP 1291 MD | 0.38 mm | Cation: 2.0 eq/L |
|  | K6387 | 0.39 mm | Anion: 1.5 eq/L |

Today, ready-to-use highly regenerated mixed bed ion exchange resins for pure water production with smaller bead size are not offered by ion exchange resin manufacturers. The resins listed above are typically sold for other applications, such as purification of sugar and related derivatives from crude sugar juice (cation exchange resins) or purification of biomolecules for pharmaceutical purposes by chromatography (anion exchange resins). Therefore, such non-regenerated resins or resins which are not treated for ultrapure water production have to be regenerated and purified before use according to the present invention. A person skilled in the art is well aware of the necessary steps. For example, the following procedure can be used: A preparation column is filled with resin and rinsed by a continuous flow of ultrapure water with 18.2 MΩ·cm and <5 ppb TOC at >60 BV/h (BV=bed volume) for >15 min. 2N HCl (for cation exchanger) or 2N NaOH (for anion exchanger) is passed at 4 BV/h for 1 hour. The column is rinsed by a continuous flow of ultrapure water with 18.2 MΩ·cm and <5 ppb TOC at >60 BV/h for >15 min. The cation exchanger and the anion exchanger are mixed in a 1/1 isocapacity ratio.

Commercially available ion exchange resins with beads of between 0.5 and 0.7 mm diameter suitable according to the present invention, are, for example:

| Manufacturer | Reference | Bead diameter | Capacity |
|---|---|---|---|
| Dow/Rohm and Haas | Mixed bed UP 6150 | 0.63 mm | Cation: 1.8 eq/L Anion: 1.1 eq/L |
| Lanxess | UP 1292 MD | 0.62 mm | Cation: 2.2 eq/L Anion: 1.1 eq/L |
|  | UP 1294 MD | 0.63 mm | Cation: 2.0 eq/L Anion: 1.1 eq/L |
| Mitsubishi | SMT 100L | >0.4 mm 90% polydisperse >1.18 mm 5% <0.3 mm 1% | Cation: 1.7 eq/L Anion: 0.9 eq/L |
|  | SMT 200L | polydisperse >1.18 mm 5% <0.3 mm 1% | Cation: 1.7 eq/L Anion: 0.9 eq/L |

Typically, the ratio of the volume of the first mixed bed ion exchanger to the volume of the second mixed bed ion exchanger is between 10:1 and 1:5.

The quantity of the first mixed bed ion-exchanger is selected within the recommended linear velocity for optimal deionization as given by the resin supplier. However, in the context of the present invention the height can be chosen much shorter than recommended.

The quantity of the second mixed bed ion exchange material is selected based on the adequate media depth requirements in order to completely adsorb ions leaked from the upper resin layer. The dynamic capacity should be close to the total ion leak from the first mixed bed ion exchange resin during the lifetime of the combination cartridge.

The diameter and height of the resin bed are determined by the target flow rate of ultrapure water production. For example, typical mixed bed ion exchange resin is operated optimally at 0.89 cm/sec linear velocity, i.e. a 69 mm diameter column is suitable to treat water at a flow rate of 2 L/min. A typical resin gives water of around 18 MΩ·cm (at 25° C.) with a 8 cm bed height when 1 MΩ·cm equivalent NaCl solution is fed to the column. The small bead resin has a higher ion-exchange kinetic, e.g. 2 times faster for a typical mixed bed ion exchange resin. In such case, the small bead resin only needs ½ of bed height in order to achieve the same ion exchange kinetic than a conventional resin bed. The expected height in use is therefore approximately ½.

Small beads or powdered ion exchange resins with diameter of smaller than 0.5 mm have a large contact surface with the water to be treated, which is the principal reason allowing for fast ion exchange speed comparing to conventionally sized ion exchange resins of average 600 µm diameter. However, the very fine adsorption media have the serious disadvantage to result in an extremely elevated pressure drop. This combination of these two types of media however surprisingly allows for a high performance water polisher, wherein the conventional resins are responsible for capacity and the fast kinetic small bead resins are responsible for the kinetic zone and quality. This combination further advantageously results in the design of compacter water deionization cartridges, in longer lifetimes and in higher product water quality.

In a further embodiment of the present invention, the method comprises a further step (c) of passing water through an activated carbon bed.

Activated carbon is able to remove dissolved organics and chlorine. Activated carbon is made of organic material porous particulates containing a maze of small pores, resulting in a large specific surface area. Organic molecules dissolved in water may enter the pores and bind to their walls by van der Waals forces.

According to the present invention natural activated carbon or synthetic activated carbon can be used. Natural activated carbon can be produced by treating vegetal products such as ground coconut shells carbonized at high temperature, resulting in irregularly shaped grains and very high mineral extraction. Synthetic activated carbon is produced by the controlled pyrolysis of synthetic spherical beads. Preferably, synthetic activated carbon is used.

According to the present invention step (c) can be performed before step (a) and step (b), between steps (a) and (b) or within step (a) and/or step (b).

Such alternatives are illustrated by the following examples:

Water is passed through the activated carbon bed first (step (c)), then through the first mixed bed ion exchanger (step (a)) and then through the second mixed bed ion exchanger (step (b)).

Water is passed through the activated carbon bed first (step (c)), then through the second mixed bed ion exchanger (step (b)) and then through the first mixed bed ion exchanger (step (a)).

Water is passed through the first mixed bed ion exchanger (step (a)), then through the activated carbon bed (step (c)), and then through the second mixed bed ion exchanger (step (b)).

Water is passed through the second mixed bed ion exchanger (step (b)), then through the activated carbon bed (step (c)), and then through the first mixed bed ion exchanger (step (a)).

Water is passed through the first mixed bed ion exchanger (step (a)), then through a first portion of the second mixed bed ion exchanger (step (b)), then through the activated carbon bed (step (c)), and then through a second portion of the second mixed bed ion exchanger (step (b)), i.e. step (c) is performed within step (b).

Water is passed through the first mixed bed ion exchanger mixed with activated carbon (step (a) and step (c)) and then through the second mixed bed ion exchanger (step (b)).

Water is passed through a first portion of the first mixed bed ion exchanger mixed with activated carbon (step (a) and step (c)), then through a second portion of the first mixed bed ion exchanger (step (a)) and then through the second mixed bed ion exchanger (step (b)).

According to the present invention the first mixed bed ion exchanger can therefore be mixed with activated carbon.

The present invention is further directed to a method as defined above, characterized in that the method comprises a further step (d) of treating water by reverse osmosis and/or a further step (e) of treating water by electrodeionization, wherein step (d) and step (e) are performed prior to steps (a) and (b).

A person skilled in the art is familiar with the steps of reverse osmosis and electrodeionization.

The step of reverse osmosis (RO) may remove many contaminants in the water, such as particles, bacteria and organics>200 Dalton molecular weight. RO is typically performed using a semi-permeable membrane, rejecting such contaminants. Hydraulic pressure is applied to the concentrated solution to counteract the osmotic pressure. The purified water can be collected downstream of the membrane.

RO membranes are typically manufactured from cellulose acetate or thin-film composites of polyamide on a polysulfone substrate.

Electrodeionization combines electrodialysis and ion exchange process, resulting in a process which effectively deionizes water, while the ion-exchange media are continuously regenerated by the electric current in the unit. Electrodeionization allows for the effective removal of dissolved inorganics, up to a resistivity of above 5 MΩ·cm at 25° C. (corresponding to a total ionic contamination level of ca. 50 ppb). According to the present invention the use of an Elix® module is preferred for electrodeionization.

Water purification systems for producing ultrapure water are known and are normally made up of peripheral components like a supporting frame, water quality monitoring resources, a pump, solenoid valves and conductivity cells and a connecting mechanism for releasably mounting one or two purification cartridges by inter-engaging complementary connectors. Since over time, the purification media get exhausted and/or the membranes get clogged replacement is needed on a timely or water consumption basis. Therefore, the media and/or membranes are typically packaged in cartridges to facilitate the correct exchange of these consumable media from the respective water purification system.

In a further embodiment the present invention therefore relates to a module comprising a first mixed bed ion exchanger comprising beads having a diameter between 0.5 and 0.7 mm and a second mixed bed ion exchanger comprising beads having a diameter of less than 0.5 mm. Such module can be used in a method as described above.

Typically, a module is a replaceable cartridge comprising the respective media. The module may be in the form of a tube, for example. For establishing the contact with the water purification system the module exhibits connectors enabling for a fluid-tight connection between the ports on the cartridge and the connectors on the system. A suitable connector is for example described in WO 2016/128107 A2.

Within the module the first and the second mixed bed ion exchanger are arranged in series. Within this regard either the first mixed bed ion exchanger can be placed in the upper part of the module and the second mixed bed ion exchanger in the lower part of the module, or vice versa. Optionally, a separating mesh or screen can be used in order to keep the media in place within the module.

The preferred embodiments of the mixed bed ion exchange resins in the modules are as defined above.

The module according to the present invention may further comprise an activated carbon bed, as defined above. In such case, the activated carbon bed may be located either upstream of the first and the second mixed bed ion exchanger or between the first and the second mixed bed ion exchangers. In a further embodiment, the activated carbon is mixed with said first mixed bed ion exchanger.

The height and the diameter of the resin bed in the tube is determined by the water feed, the water quality to be achieved and the capacity of the cartridge, which can easily be done by a person skilled in the art.

For example, according to the standard resin specifications of UP6150 from Dow/Rohm (a typical resin as mentioned above), a minimum resin bed height of 900 mm is required while the service flow rate is between 30 and 40 bed volume per hour (BV/h) for deionization and ultrapure water polishing. A typical laboratory ultrapure water system is designed to dispense 2 L/min. 3-4 L resin with the required bed height and bed volume to process 2 L/min requires a column inner diameter of 65.2 mm to 75.2 mm with a linear velocity (LV) of 1 cm/sec to 0.75 cm/sec (36 m/h to 27 m/h).

The same calculation for the resin Lanxess UP1292/1294 with a given specification of the minimum bed height of 600 mm and a flow rate of 48 BV/h, results in an optimal diameter of 73 mm and a linear velocity of 0.8 cm/sec (28m/h).

Typical laboratory ultrapure water systems such as Milli-Q respect this rule leading to a column diameter of 69 mm.

According to the present invention the total resin bed height in the cartridge is typically between 10 and 40 cm. Preferably, the total resin bed height is between 10 and 30 cm. In a very preferred embodiment the total resin bed height is around 25 cm.

The cartridge is filled with the different types of resins. Typically, the resin bed height of the first ion exchange resin in the cartridge is between 5 and 20 cm, preferably between 5 and 15 cm. The resin bed height of the second mixed bed ion exchange resin bed is typically between 5 and 20 cm, preferably between 5 and 15 cm.

Typically, the cartridges are in tube form having an inner diameter between 65 and 75 mm, preferably around 69 mm.

The combination of a standard resin and a small bead resin according to the present invention is very advantageous in view of the prior art. From a kinetic point of view a small bead resin needs only a resin bed height of 10 cm to achieve 18.2 MΩ·cm from a water feed of 25 µS/cm, while a standard resin requires a bed height of more than 20 cm. Since the last 10 cm zone of the cartridge plays the kinetic role in determining dynamic capacity, the resin type before this zone has no impact to capacity. In other words, a cartridge entirely filled with a small bead resin may show the same capacity as a cartridge filled with a combination of small bead resin and standard resin. Within this regard replacing 10 cm of the bottom zone of a cartridge filled with standard resin by a small bead resin results in an outstanding effect reflected by a capacity increase of almost 1000 L. On the other hand, the combination of standard resin and small bead resin is also advantageous from the viewpoint of hydraulic loss. Compared to a 30 cm small bead resin bed, a 20+10 combination pack exhibits only a ⅔ pressure drop. In other words, compared to a 30 cm standard media cartridge, the combination pack of 20 cm standard resin bed and 10 cm small bead resin bed results in a 30% higher pressure drop, but with a capacity increased by 50%. Still in other words, the 20+10 combination pack exhibits almost the same pressure drop as a 40 cm standard resin bed cartridge, but has a column height reduced by 25% and 20% more capacity.

Possible arrangements of the resins in the modules are, for example:

(1) A module in tube form having an inner diameter of 69 mm and a total resin bed height of 25 cm comprises two resin bed sections: The upper section, having a height of 15 cm, is filled with the first mixed bed ion exchanger; the lower section, having a height of 10 cm, is filled with the second mixed bed ion exchanger.

(2) A module in tube form having an inner diameter of 69 mm and a total resin bed height of 31 cm comprises two resin bed sections: The upper section, having a height of 20 cm, comprises the first mixed bed resin mixed with activated carbon; the lower section, having a height of 11 cm, is filled with the second mixed bed ion exchanger.

(3) A module in tube form having an inner diameter of 69 mm and a total resin bed height of 30 cm comprises two resin bed sections: The upper section, having a height of 20 cm, is filled with the first mixed bed ion exchanger or a homogeneous mixture of spherical activated carbon and the first mixed bed ion exchanger; the lower section, having a height of 10 cm, is filled with the second mixed bed ion exchanger.

In a preferred embodiment arrangement (1) is used.

The above configurations are for example suitable when using feed water with a conductivity of 25 µS/cm, which is typical for a reverse osmosis pretreated water. If a more advanced pretreatment system is used, such as reverse osmosis combined with deionization or electrodeionization, or distillation, the feed of the final polishing system may have a conductivity of down to 1 µS/cm. In this case, even shorter modules can be used, such as:

(4) A module in tube form having an inner diameter of 69 mm and a total resin bed height of 15 cm comprises three resin bed sections: The upper section, having a height of 5 cm, is filled with activated carbon; the middle section, having a height of 5 cm, is filled with the first mixed bed ion exchanger; the lower section, having a height of 5 cm, is filled with the second mixed bed ion exchanger.

(5) A module in tube form having an inner diameter of 69 mm and a total resin bed height of 15 cm comprises three resin bed sections: The upper section, having a height of 5 cm, is filled with activated carbon; the middle section, having a height of 5 cm, is filled with the second mixed bed ion exchanger; the lower section, having a height of 5 cm, is filled with the first mixed bed ion exchanger.

(6) A module in tube form having an inner diameter of 69 mm and a total resin bed height of 15 cm comprises two resin bed sections: The upper section, having a height of 10 cm, comprises the first mixed bed resin mixed with activated carbon; the lower section, having a height of 5 cm, is filled with the second mixed bed ion exchanger.

(7) A module in tube form having an inner diameter of 69 mm and a total resin bed height of 10 cm comprises two resin bed sections: The upper section, having a height of 5 cm, comprises the first mixed bed ion exchanger; the lower section, having a height of 5 cm, is filled with the second mixed bed ion exchanger.

By using a second mixed bed ion exchanger having very small bead diameters, such as smaller than 120 µm, the height of the ion exchange zone can be reduced even further, resulting in a very high compactness of the polishing cartridge. The pressure drop increase related to the diameter reduction of the beads is compensated by the volume reduction of the resin bed. When using a 1 µS/cm feed and a second mixed bed ion exchanger having a diameter of less than 120 µm, the following module could be used according to the present invention:

(8) A module in tube form having an inner diameter of 69 mm and a total resin bed height of 8 cm comprises two resin bed sections: The upper section, having a height of 5 cm, comprises the first mixed bed ion exchanger; the lower section, having a height of 3 cm, is filled with the second mixed bed ion exchanger.

In a further embodiment the present invention relates to a water treatment system for producing ultrapure water comprising a first mixed bed ion exchanger comprising beads having a diameter between 0.5 and 0.7 mm and a second mixed bed ion exchanger comprising beads having a diameter of less than 0.5 mm.

Water treatment systems are known in the art. They typically comprise peripheral components like a supporting frame, water quality monitoring resources, pumps, solenoid valves and conductivity cells. When the mixed bed ion exchangers are provided in modules a connecting mechanism for releasably mounting one or more of such modules by inter-engaging complementary connectors is also required. A connecting mechanism which can be used according to the present invention is for example described in WO 2016/128107 A1.

The present invention therefore also relates to water treatment system as defined above wherein the first and the second mixed bed ion exchanger are provided in a single module as defined above.

In an alternative embodiment, the first and the second mixed bed ion exchanger are provided in at least two modules. For example, the first mixed bed ion exchanger may be provided in a first cartridge and the second mixed bed ion exchange resin in a second cartridge. The modules may be provided individually, or molded together.

The water treatment system may further comprise an activated carbon bed, as defined above.

Again, the first mixed bed ion exchanger, the second mixed bed ion exchanger and the activated carbon bed may be provided in a single module, as defined above.

Alternatively, in a preferred embodiment, the activated carbon bed is provided in a further module, comprising the activated carbon bed alone or alternatively together with a mixed bed ion exchanger comprising beads having a diameter of of less than 0.5 mm.

For example, in a preferred embodiment, the water purification system may comprise two modules: The first module comprises the first mixed bed ion exchanger and the second mixed bed ion exchanger. The second module, located downstream of the first module, comprises granular activated carbon and a further mixed bed ion exchanger comprising beads having a diameter of of less than 0.5 mm. A UV photooxidation device is located between the two modules.

The first module, having a tube form with an inner diameter of 69 mm and a total resin bed height of 25 cm, is designed to deionize water from pretreated water, such as water pretreated by reverse osmosis, deionization, electrodeionization, distillation, filtration or combinations of these methods, to ultrapure water up to 18.2 MΩ·cm prior to photooxidative TOC reduction. The combination of a standard resin (i.e. the first mixed bed ion exchange resin) with a fast kinetic resin (i.e. the second mixed bed ion exchange resin) guarantees the maximum dynamic capacity. An intermediate resistivity cell can be used to measure the water quality after the first cartridge for indication of the end of the "lifetime" of the first cartridge, what in turn indicates that the end of the "lifetime" of the entire paired pack (i.e. both cartridges) is approaching. The use of the fast kinetic zone in the first cartridge assures the maximum cartridge capacity of the cartridge pair and a minimum of trace ions leaking to the second cartridge. The inner diameter of the cartridge is typically around 69 mm and is filled in its 15 cm upstream section with standard ion exchange resin as capacity zone, and in its 10 cm downstream section with fast kinetic resin as ion exchange zone.

The inner diameter of the second cartridge is also typically around 69 mm and is filled in its 12.5 cm upstream section with activated carbon, and in its 12.5 cm downstream section with fast kinetic resin. The second module serves as trace removal zone during the nominal operating period or as ion exchange zone and trace removal zone after the saturation of the first cartridge. A separated carbon layer is placed at the upstream (inlet) side of the cartridge to remove organic contaminants in water. At the same time, the carbon will catch harmful photooxidation by-products, such as radicals, peroxides, etc., which are generated by the photooxidation device.

FIGURES

FIG. 1: Experimental setup for the dynamic capacity test as described in Example 1.

Figure 2A:
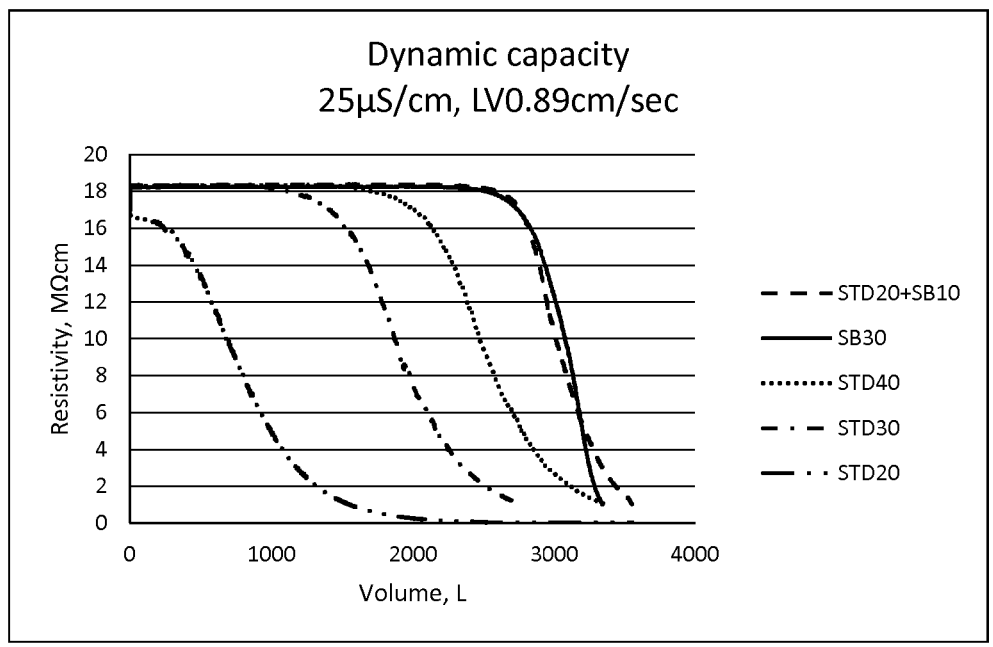

FIG. 2A: Comparison of the capacity of different media configurations using a synthetic 25 µS/cm NaCl solution as feed water as described in Example 2.

Figure 2B:
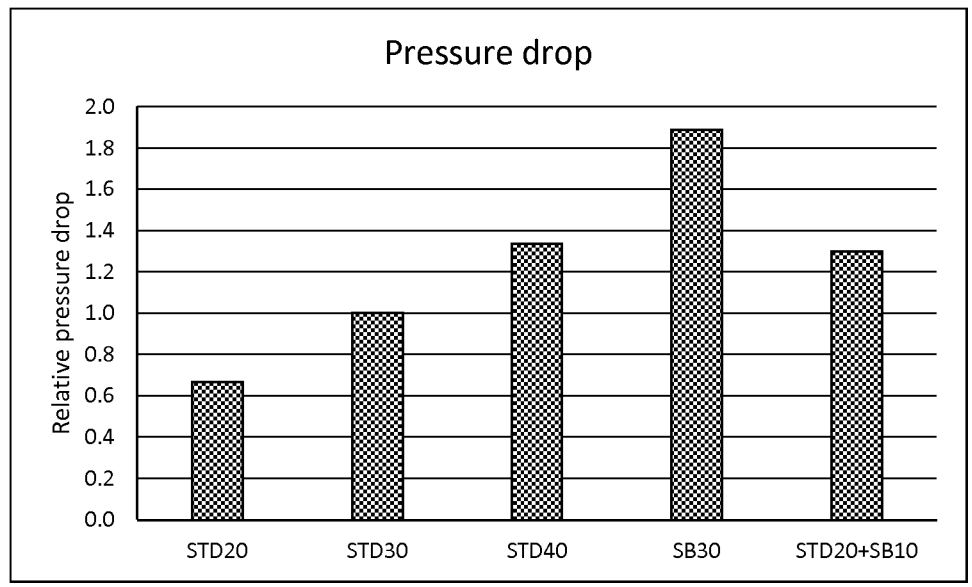

FIG. 2B: Comparison of the hydraulic loss of different media configurations as described in Example 2.

FIG. 3A: Test cartridge configurations as described in Example 3.

Figure 3B:
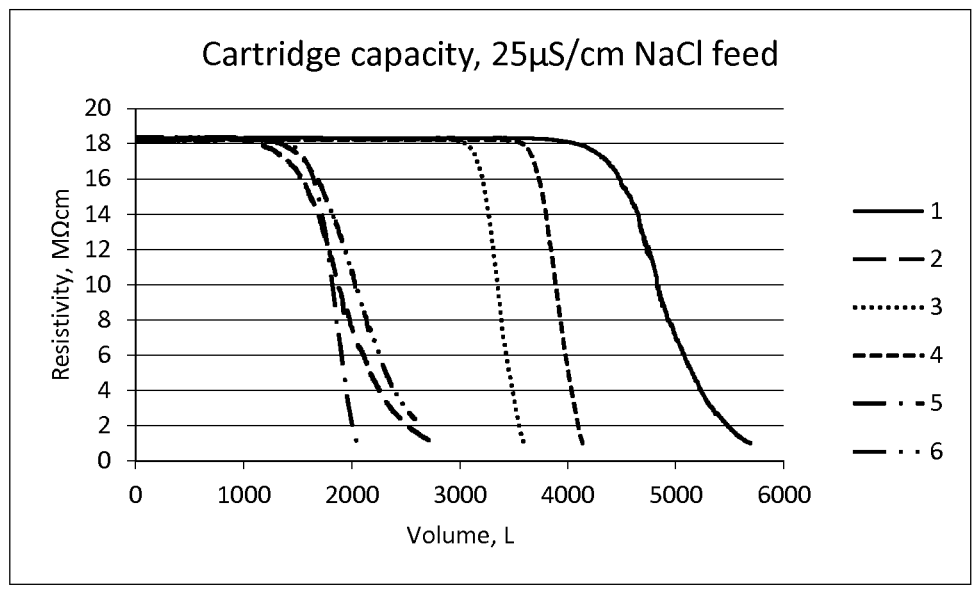

FIG. 3B: Comparison of the capacity of different media configurations using a synthetic 25 µS/cm NaCl solution as feed as described in Example 3.

Figure 3C:
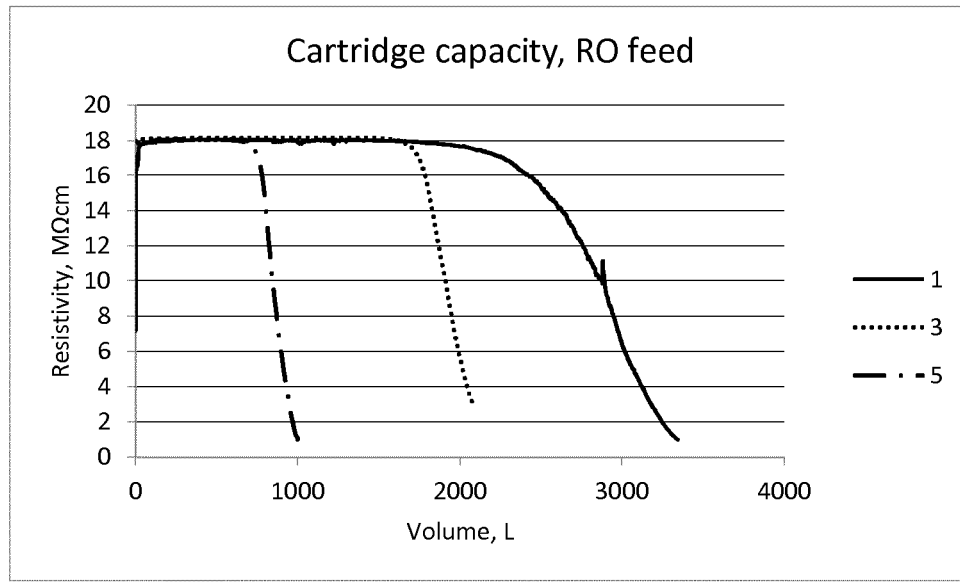

FIG. 3C: Comparison of the capacity of different media configurations using a RO water feed as described in Example 3.

FIG. 4: Comparison of the capacity of different media configurations using a RO water feed as described in Example 4.

FIG. 5: Comparison of the capacity of different media configurations using a synthetic 25 µS/cm NaCl solution as feed water as described in Example 5.

FIG. 6: Comparison of the capacity of different media configurations using an Elix water feed as described in Example 6.

FIG. 7: Comparison of the capacity of different media configurations using an Elix water feed as described in Example 7.

FIG. 8: Three zones of an ion exchange cartridge.

EXAMPLES

Example 1

Mixed Bed Resins Used in the Examples and Experimental Setup for Simulating Different Water Conditions The table below summarizes characteristic parameters of resin types of small bead mixed bed resins and standard resin:

|  |  | Reference | Capacity | Diameter |
|---|---|---|---|---|
| Laboratory made small bead mixed bed ion exchange resin (SB) A | Anion exchanger | Diaion MS01SS | 1.3 eq/L | 0.35 mm |
|  | Cation exchanger | Diaion UBK530K | 1.6 eq/L | 0.35 mm |
| Laboratory made small bead mixed bed ion exchange resin (SB) B | Anion exchanger | Lewatit K6387 | 1.5 eq/L | 0.39 mm |
|  | Cation exchanger | Lewatit MDS 200H | 2.3 eq/L | 0.33 mm |
| Standard resin, Jetpore ®, used in Milli-Q consumable cartridges (STD) | Anion exchanger | NA | 1.2 eq/L | 0.63 mm |
|  | Cation exchanger | NA | 2.2 eq/L | 0.53 mm |

In the following examples the small bead mixed bed ion exchange resin B is used. Small bead mixed bed ion exchange resin A is equally suitable for the purpose of the present invention and its use in the below experiments will lead to similar results.

Non-regenerated resins or resins which are not treated for ultrapure water production are regenerated and purified according to the following procedure:

A preparation column is filled with resin and rinsed by a continuous flow of ultrapure water with 18.2 MΩ·cm and <5 ppb TOC at >60 BV/h (BV=bed volume) for >15 min.

2N HCl solution (prepared from 25% HCl (EMSURE, Merck KGaA)) (for cation exchanger) or 2N NaOH solution (prepared from 50% NaOH (EMSURE, Merck KGaA)) (for anion exchanger) is passed at 4 BV/h for 1 hour.

The column is rinsed by a continuous flow of ultrapure water with 18.2 MΩ·cm and <5 ppb TOC at >60 BV/h for >15 min.

Cation exchanger and anion exchanger are mixed in a 1/1 isocapacity ratio. Mixed resin is stored in heat-sealed plastic bag or tightly closed bottle.

Dynamic Capacity Test Condition:

For simulating typical feed water conditions in laboratory, NaCl (Merck EMSURE®) is spiked to a conductivity of 25 µS/cm into ultrapure water prepared by Elix® 100 system (Merck KGaA, Darmstadt, Germany), SDS 200 (Merck KGaA, Darmstadt, Germany) and Mill-Q® Reference A+ (Merck KGaA, Darmstadt, Germany).

In the test bench, ultrapure water stored in 10 L PE tank recirculates through a make-up polisher (Quantum TEX polishing cartridge, Merck KGaA, Darmstadt, Germany) and a test column containing ion exchange resin samples. Upstream of the test tube, a salt injection point is located where a precise injection pump (ISMATEC MCP-CPF process pump+PM0CKC pump head) spikes concentrated salt solution prepared at 30 g/L to target conductivity of 25 µS/cm. Resistivity sensors (Thornton 770MAX, Mettler Toledo) mesure water resistivity at the inlet and outlet of the test column.

The diameter of the test column is 35 mm as ¼ scale model or 69 mm as 1/1 scale model. The flow rate of water recirculation is adjusted to a linear velocity of 0.89 cm/sec, i.e. 0.5 L/min or 2.0 L/min for both column diameters, respectively.

The experimental setup is shown in FIG. 1.

Real Feed Water Condition:

Generally, laboratory-use ultrapure water is produced from tap water through pretreatment techniques such as RO, RO-DI, RO-EDI, distillation or a combination thereof, before final polishing steps with high quality ion exchange resins. Two categories of feed water are possible:

1) high ionic charge feed water, often delivered from reverse osmosis system with 5-50 µS/cm conductivity, including dissolved $CO_2$. RiOs (Merck KGaA, Darmstadt, Germany) system is used to prepare RO water with municipal water feed (Guyancourt, France). Average water quality is 15-25 µS/cm with 15-20 ppm $CO_2$.
2) low ionic charge feed water from RO-DI, RO-EDI or distilled systems containing only up to 1 µS/cm equivalent salts. Elix® system (Merck KGaA, Darmstadt, Germany) is used to prepare this type of water with municipal water feed (Guyancourt, France). Average water quality is 0.1-1 µS/cm with ppm $CO_2$ below limit of detection(<1 ppm).

The following examples show the performance of the media for both conditions.

Water quality is measured at column or cartridge outlet using a resistivity sensor and/or a TOC analyzer (A100/A1000, Anatel).

Example 2

Capacity of Different Media

A single 30 cm tube (diameter 35 mm) is filled by mixed bed resins. The resin bed columns are run with 25 µS/cm NaCl solution at 0.5 L/min, equivalent to 0.89 cm/sec velocity to check effluent resistivity changes and cartridge capacities. 10 MΩ·cm set point is applied to capacity end point. Additionally, hydraulic loss of each configuration is measured by using differential pressure gauge. The results are normalized to the value obtained with 30 cm standard resin bed.

The performance of the following resin bed columns is analyzed:

1) Standard resin bed, Jetpore: 20 cm height (STD20)
2) Standard resin bed, Jetpore: 30 cm height (STD30)
3) Standard resin bed, Jetpore: 40 cm height (STD40)
4) Combination of 20 cm standard resin bed (upstream) and 10 cm small bead resin bed (downstream) (STD20+SB10)
5) Small bead resin bed: 30 cm height (SB30)

The results are shown in FIG. 2A:

Column 1, filled with 20 cm standard resin bed, does not achieve 18 MΩ·cm (at 25° C.) resistivity. Column 2 and 3, filled with 30 cm and 40 cm of standard resin bed can maintain an ultrapure water quality plateau. The combination of 20 cm standard resin bed and 10 cm small bead resin bed (column 4) exhibits a much higher capacity as the same height (30 cm) of standard resin bed (column 2). In addition, the capacity is even better than for a higher column (40 cm) of standard resin bed (column 3). The experiment with column 5, filled with 100% of small bead resin bed, results in almost the same curve as the combined column 3, despite the much higher amount of fast kinetic resin bed.

FIG. 2B shows the results of hydraulic loss of the test columns. Compared to column 4 (20 cm STD+10 cm SB), column 3 (40 cm STD) shows almost the same hydraulic loss regarding pressure drop while this configuration has much less capacity despite the fact that it has a higher resin bed quantity.

Example 3

Feed Water With High Ionic Charge, Case 1

Commercially available Milli-Q® Direct from Merck Millipore is an all-in-one system which treats tap water to ultrapure water through activated carbon pretreatment, reverse osmosis, storage tank, UV photooxidation and deionization. In the final DI step, ion exchange resins are used. Typically, tap water ranging from 100 up to 2000 µS/cm is purified ionically to 96% to 99% rejection, thus the feed ionic charge ranges from a few micro Siemens to 50 µS/cm. In the state of the art, the final polishing cartridge, Q-PAK TEX, has twice 1.2 L volume of granular purification media (diameter 69 mm, height 320 mm), and contains 1.2 L of Organex (which is a homogeneous mixture of spherical activated carbon and standard mixed bed ion exchange resin) in the first tube, and 1.2 L mixed bed resin bed in the second tube. Operation is at 2 L/min (linear velocity 0.89 cm/sec).

The following tests are performed in a ¼ scale model, maintaining the linear velocity, whereas the column section and the flow rate are reduced by 4, the diameter is 35 mm and the flow rate is at 0.5 L/min. The cartridges are tested in continuous flow mode at a given flow rate with a synthetic 25 µS/cm NaCl solution and in some cases with an RO water feed. The X-axis of the capacity curve is reported as 69 mm equivalent.

The following configurations are tested:

| Configuration | First column | Second column | Tested feed water 25 μS/cm | RO |
|---|---|---|---|---|
| 1 (prior art) | Organex resin bed 32 cm | Standard resin bed 32 cm | yes | yes |
| 2 (comparison) | Organex resin bed 20 cm | Standard resin bed 20 cm | yes | — |
| 3 (invention) | Organex resin bed 32 cm | Standard resin bed 10 cm + Small bead resin bed 11 cm | yes | yes |
| 4 (invention) | Standard resin bed 16 cm | Standard resin bed 10 cm + Small bead resin bed 11 cm | yes | — |
| 5 (invention) | Organex resin bed 20 cm | Small bead resin bed 11 cm | yes | yes |
| 6 (comparison) | Standard resin bed 30 cm | — | yes | — |

The test configurations are illustrated in FIG. 3A.

The results are shown in FIG. 3B (synthetic 25 μS/cm NaCl solution feed) and FIG. 3C (RO water feed):

The standard pack configuration (1) with 32 cm of Organex resin bed and 32 cm of standard resin bed shows a resistivity drop below 18 MΩ cm (at 25° C.) at 4000 L.

The same configuration, but with a height of only 20 cm for each resin bed (2), results in a dramatic loss in capacity.

In configuration (3) 20 cm of standard resin bed are replaced by 10 cm of a small bead resin bed. Despite the reduced resin bed volume this configuration is able to maintain almost the same capacity as the original configuration (1).

If the organic contamination level is not sensitive to applications, configuration (4) is a beneficial alternative to configuration (3) providing for more compactness.

Configuration (5) is an extremely compact pack design. This configuration, having only half of the media volume, can still consistently produce ultrapure water of 18.2 MΩ·cm.

For comparison, the result for a 30 cm standard resin bed is shown in configuration (6).

Example 4

Feed Water with High Ionic Charge, Case 2

Commercially available Milli-Q® Advantage from Merck Millipore is an Ultrapure polishing system fed by a pretreatment system such as RO, RO-DI, RO-EDI, DI and/or distillation. The system is equipped with the following modules: "Q-Gard T1", a two-tube module, containing 1.2 L of Organex resin bed and 1.2 L of standard mixed bed resin bed, 17W photooxidation UV reactor, and "Quantum TEX", a single-tube module, containing 0.5 L of Organex resin bed and 0.5 L of mixed bed resin bed. The pack diameter is 69 mm. The first two-tube module has a height of 32 cm, the second single-tube cartridge a height of 25 cm. The system is capable to dispense 2 L/min.

This prior-art system is compared with two solutions according to the present invention. The following configurations are tested, using RO feed water as described in Example 1:

| Configuration | First module | Second module |
|---|---|---|
| 1 (prior art) | Organex resin bed 32 cm + Standard resin bed 32 cm | Organex resin bed 12.5 cm + Standard resin bed 12.5 cm |
| 2 (comparison) | Standard resin bed 25 cm | Activated carbon bed 10 cm + Standard resin bed 15 cm |
| 3 (invention) | Standard resin bed 15 cm + Small bead resin bed 10 cm | Activated carbon bed 12.5 cm + Small bead resin bed 12.5 cm |

The results are shown in FIG. 4:

Instead of three columns in series (configuration 1) which are used in the prior art, the present invention (configuration 3) allows for the use of a much more compact solution.

Example 5

Compact Ultrapure Water System

Commercially available Direct-Q® from Merck Millipore is an all-in-one system which treats tap water to ultrapure water through activated carbon pretreatment, reverse osmosis, storage tank, UV photooxidation and deionization. In the final DI step, ion exchange resins are used. Typically, tap water ranging from 100 up to 2000 μS/cm is purified ionically to 96% to 99% rejection, thus the feed ionic charge ranges from a few micro Siemens to 50 μS/cm. In the state of the art, the final polishing cartridge, Smartpak DQ, has 1.0 L volume of granular purification media (nominal diameter 69 mm, height 250 mm), and contains 0.5 L of Organex (which is a homogeneous mixture of spherical activated carbon and standard mixed bed ion exchange resin) in the upper compartment of the tube, and 0.5 L mixed bed resin in the lower compartment. Operation is limited at 0.7 L/min (linear velocity 0.31 cm/sec) because of lack of ion exchange resin to guarantee.

The following tests are performed in a 1/1 scale model. While the cartridge according to the prior art is tested at 0.7 L/min, the cartridge according to the present invention using small bead resin is tried to operate 2 L/min. The cartridges are tested in intermittent flow mode at a given flow rate for 3 times 6 L dispenses every 2 hours with an RO water feed.

| Configuration | Upper compartment | Lower compartment |
|---|---|---|
| 1 (prior art) | Organex resin bed 12.5 cm | Standard resin bed 12.5 cm |
| 2 (invention) | Organex resin bed 15 cm | Small bead resin bed 10 cm |

The results are shown in FIG. 5: The prior art solution is designed to produce ultrapure water at 0.7 L/min with a total resin bed height of 25 cm. Surprisingly, the solution according to the present invention with 25 cm resin bed height achieves the same water quality and cartridge capacity at an elevated flow rate of 2 L/min without any degradation of performance. Comparing total quantities of ion exchangers in both designs, the cartridge according to the present invention allows for a higher flow rate using less resin.

Example 6

Feed Water With Low Ionic Charge

Commercially available Milli-Q® Integral from Merck Millipore is an all-in-one system which treats tap water to ultrapure water through activated carbon pretreatment, reverse osmosis, electrodeionization, in-line sterilizer, storage tank, UV photooxidation and deionization. In the final DI step, ion exchange resins are used. Typically, tap water ranging from 100 up to 2000 µS/cm is treated through the purification steps upstream of the tank to 1 µS/cm and 100 ppb TOC. The water in the tank is passes through UV light and a polisher to obtain ultrapure water on demand. As described for the previous examples the typical column diameter is 69 mm and the pack height is 25 cm, comprising Organex resin and a standard mixed bed ion exchange resin. The flow rate is 2 L/min (linear velocity 0.89 cm/sec).

The following tests, using Elix feed water as described in Example 1, compare the prior art solution (single tube with 69 mm diameter, 25 cm height) with configurations according to the present invention. These configurations use single cartridges of only 15 cm height at 69 mm diameter with a combination of activated carbon and different media layers as shown in the following table.

| Configuration | First medium | Second medium | Third medium |
|---|---|---|---|
| 1 (prior art) | Organex resin bed 12.5 cm | Standard resin bed 12.5 cm | — |
| 2 (invention) | Activated carbon bed 5 cm | Standard resin bed 5 cm | Small bead resin bed 5 cm |

The results are shown in FIG. 6:

Configuration 2, combining 5 cm standard resin bed and 5 cm small bead resin bed, can produce consistently water of 18.2 MΩ·cm quality from Elix water. The additional 5 cm activated carbon layer on the top of ion exchange resin bed assures an adequate level of TOC content in ultrapure water. The height of the ultrapure water polishing cartridge according to the present invention is approximately half of the height of the compared prior art solution.

Further tests are performed using the following configuration:

| Configuration | First medium | Second medium |
|---|---|---|
| 1 (prior art) | Organex resin bed 12.5 cm | Standard resin bed 12.5 cm |
| 2 (invention) | Organex resin bed 10 cm | Small bead resin bed 5 cm |

The results are shown in FIG. 7:

Instead of separating the activated carbon bed and the ion exchange resin bed, Organex resin being a homogeneous mixture of activated carbon and ion exchange resin is applied to first medium. 18.2 MΩ·cm ultrapure water is obtained by the invention, silimar to the example above TOC is good as well.

The invention claimed is:

1. A method for producing purified water comprising a step (a) of passing water through a first mixed bed ion exchanger comprising beads having a diameter between 0.5 and 0.7 mm and a step (b) of passing water through a second mixed bed ion exchanger comprising beads having a diameter of less than 0.5 mm, wherein the ratio of the volume of the first mixed bed ion exchanger to the volume of the second mixed bed ion exchanger is between 10:1 and 1:1, and wherein the water is not passed through any other ion exchanger to produce said purified water.

2. A method according to claim 1, wherein the purified water is ultrapure water having a resistivity greater than 18 MΩ·cm.

3. A method according to claim 1, wherein step (a) is performed before step (b).

4. A method according to claim 1, wherein the first mixed bed ion exchanger comprises media that consists of a mixture of anion exchange beads and cation exchange beads.

5. A method according to claim 1, wherein the second mixed bed ion exchanger comprises media that consists of a mixture of anion exchange beads and cation exchange beads.

6. A method according to claim 1, wherein the first mixed bed ion exchanger is based on styrene divinylbenzene co-polymer.

7. A method according to claim 1, wherein the second mixed bed ion exchanger is based on styrene divinylbenzene co-polymer.

8. A method according to claim 1, wherein the method comprises a further step (c) of passing water through an activated carbon bed.

9. A method according to claim 1, wherein the method comprises a further step (d) of treating water by reverse osmosis performed prior to steps (a) and (b), or a further step (e) of treating water by electrodeionization performed prior to steps (a) and (b); or wherein the method comprises a further step (d) of treating water by reverse osmosis and a further step (e) of treating water by electrodeionization, wherein step (d) and step (e) are performed prior to steps (a) and (b).

10. A module comprising a first mixed bed ion exchanger comprising beads having a diameter between 0.5 and 0.7 mm and a second mixed bed ion exchanger comprising beads having a diameter of less than 0.5 mm, wherein the ratio of the volume of the first mixed bed ion exchanger to the volume of the second mixed bed ion exchanger is between 10:1 and 1:1, and wherein the module is devoid of any additional ion exchanger.

11. A module according to claim 10, wherein the first mixed bed ion exchanger is based on styrene divinylbenzene co-polymer.

12. A module according to claim 10, wherein the second mixed bed ion exchanger is based on styrene divinylbenzene copolymer.

13. A module according to claim 10, wherein it further comprises an activated carbon bed.

14. A water treatment system for producing ultrapure water having a resistivity greater than 18 MΩ·cm, comprising a first mixed bed ion exchanger comprising beads having a diameter between 0.5 and 0.7 mm and a second mixed bed ion exchanger comprising beads having a diameter of less than 0.5 mm, wherein the ratio of the volume of the first mixed bed ion exchanger to the volume of the second mixed bed ion exchanger is between 10:1 and 1:1, and wherein the system is devoid of any additional ion exchanger to produce said ultrapure water.

15. A water treatment system according to claim 14, wherein the first and the second mixed bed ion exchanger are provided in a single module comprising a first mixed bed ion exchanger comprising beads having a diameter between 0.5 and 0.7 mm and a second mixed bed ion exchanger comprising beads having a diameter of less than 0.5 mm.

16. A water treatment system according to claim 14, wherein the first and the second mixed bed ion exchanger are provided in at least two modules.

17. A water treatment system according to claim 14, further comprising an activated carbon bed.

18. The module of claim 13, wherein said activated carbon bed is mixed with said first mixed bed ion exchanger.

\* \* \* \* \*